(12) United States Patent
Shimamura et al.

(10) Patent No.: US 7,423,825 B2
(45) Date of Patent: Sep. 9, 2008

(54) DISK UNIT AND MANUFACTURING METHOD THEREOF

(75) Inventors: Naoki Shimamura, Kanagawa (JP); Osama Takazawa, Kanagawa (JP); Kaoru Umemura, Kanagawa (JP); Kazuhiko Washizu, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 414 days.

(21) Appl. No.: 11/172,199

(22) Filed: Jun. 29, 2005

(65) Prior Publication Data

US 2005/0286156 A1 Dec. 29, 2005

(30) Foreign Application Priority Data

Jun. 29, 2004 (JP) ............... 2004-191183

(51) Int. Cl.
*G11B 27/36* (2006.01)
(52) U.S. Cl. ........................................ 360/31
(58) Field of Classification Search ............... None
See application file for complete search history.

(56) References Cited

U.S. PATENT DOCUMENTS

| 4,498,146 A * | 2/1985 | Martinez ............... 711/115 |
| 6,005,740 A | 12/1999 | Liikanen |
| 6,476,997 B2 * | 11/2002 | Fukushima et al. ...... 360/77.08 |
| 6,785,084 B2 * | 8/2004 | Szita .................... 360/77.04 |
| 6,791,778 B2 * | 9/2004 | Chu et al. .............. 360/53 |
| 6,930,852 B2 * | 8/2005 | Kim .................... 360/77.08 |
| 2002/0048112 A1 * | 4/2002 | Chu et al. .............. 360/75 |
| 2002/0126404 A1 * | 9/2002 | Hattori et al. ........... 360/31 |

FOREIGN PATENT DOCUMENTS

| JP | 07-153212 | 6/1995 |
| JP | 2003-331545 | 11/2003 |

* cited by examiner

*Primary Examiner*—Andrea Wellington
*Assistant Examiner*—Dan I Davidson
(74) *Attorney, Agent, or Firm*—Townsend and Townsend and Crew LLP; Patrick Duncan

(57) ABSTRACT

A disk unit is capable of detecting a track, the track width of which deviates from a normal value, with high accuracy at high speed. A HDD includes a read head, a disk and defective-track detecting part. The disk has servo data including bursts A, B written thereon. The servo data is used to position the read head to a track center. The defective-track detecting part detects a defective track as below. The sum of the amplitude of bursts A and B, which have been read by the read head by one read operation, is divided by the amplitude of a burst C or D to obtain a compared value. If the compared value deviates from a criterion by a specified percentage or more, it is judged that the track width of a track is abnormal. Since bursts A through D are written without trimming, the size of bursts A through D in the track width direction are kept constant regardless of the track width. Accordingly, a gap G fluctuating in accordance with the track width is formed in the radial direction between bursts A and B. Bursts A and B are read at a position including gap G, and the above-mentioned compared value is determined, and thereby a defective track is detected.

28 Claims, 15 Drawing Sheets

Fig. 4
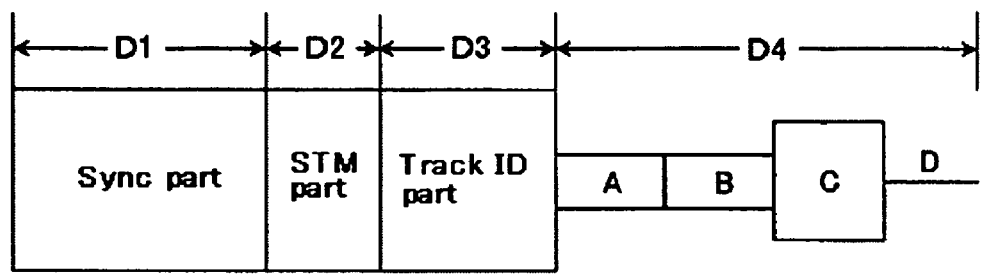
(a)
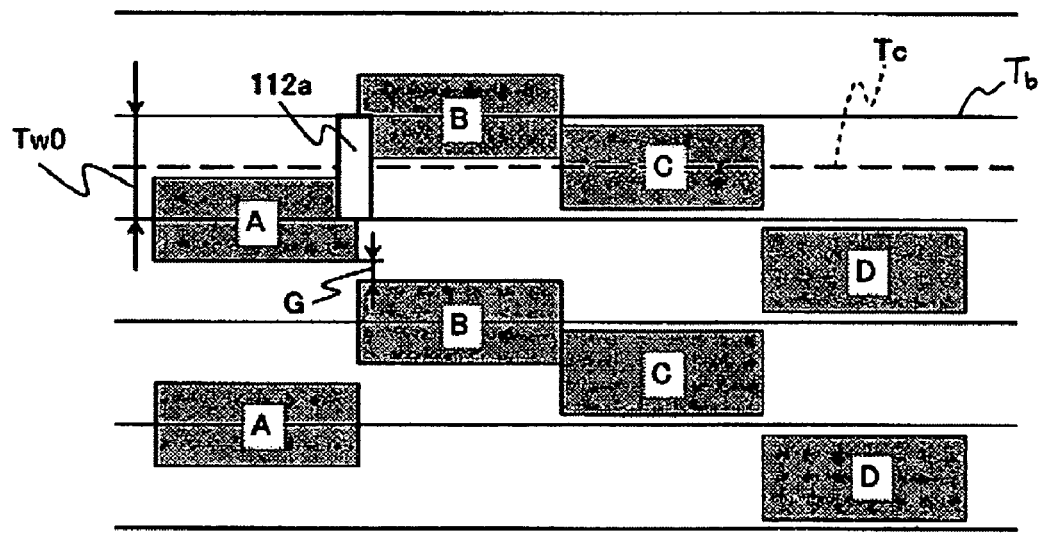
(b)

Fig. 12
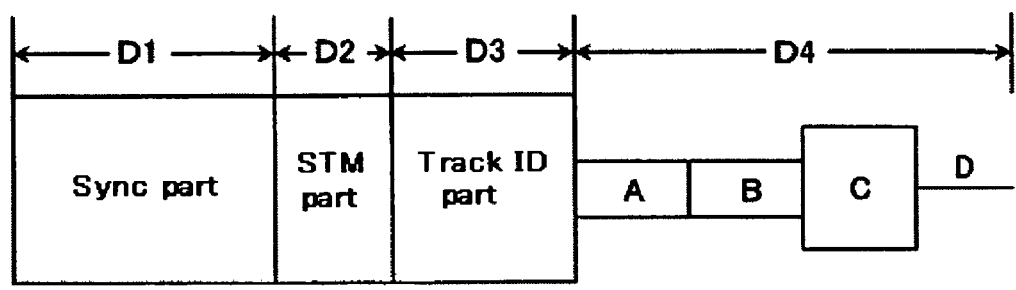
(a)
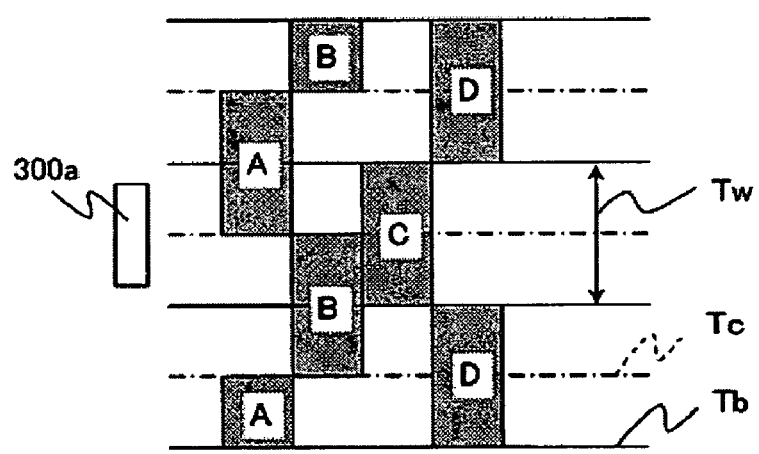
(b)

DISK UNIT AND MANUFACTURING METHOD THEREOF

CROSS-REFERENCES TO RELATED APPLICATIONS

This application claims priority from Japanese Patent Application No. JP2004-191183, filed Jun. 29, 2004, the entire disclosure of which is incorporated herein by reference.

BACKGROUND OF THE INVENTION

The present invention relates to disk units having a head, the positioning of which is controlled by use of a burst pattern included in servo data, and a manufacturing method thereof, and more particularly to a disk unit that is devised to avoid an error such as offtrack caused by an abnormal condition of the track width, and a manufacturing method thereof.

Devices using various types of media such as optical disks and magnetic tapes are known as data storage devices. Among them, hard disk drives (HDDs) have become popular as storage devices for computers to such an extent that they are one of the storage devices indispensable for today's computer systems. Further, not limited to computers, their application is widening more and more due to the superior characteristics with the advent of moving picture recording/reproducing devices, car navigation systems, removable memories for digital cameras and so on.

In general, a HDD comprises a magnetic disk as a medium. A track of the magnetic disk is formed by servo data that is written on the magnetic disk by a servo writer, or the like. To be more specific, servo data as shown in FIG. 12(a) is written to follow a concentric track. The servo data is written to a plurality of positions on a track. The servo data is formed of well-known areas including: a Sync part D1 to which Sync data used for data synchronization is written; a STM (Servo track mark) part D2 to which a servo mark indicating the start of the servo data is written; a track ID part D3 having position information indicating a position of a track in a sequence, and the like; and a Burst part D4 to which a burst pattern used for fine position control is written. The Sync part D1 includes servo AGC (Automatic Gain Control) that adjusts an amplification factor of a signal amplifier to keep the amplitude constant before reading out servo data.

For example, as shown in FIG. 12(b), the burst pattern which is written to the Burst part D4 is formed of four kinds of burst patterns, that is, bursts A, B, C, D. Those burst patterns are read by the head, and then the change in amplitude obtained from the read signal (burst signal) is digitized. The digitized change is used for tracking control (track following) of the head element 112, or the like.

In FIG. 12(b), on the assumptions that reference character Tc is a track center, Tb is a track boundary, and Tw is a track width, the bursts A, B are signals alternately written at constant intervals to an area from the track center Tc to one adjacent track center Tc and an area from the track center Tc to the other adjacent track center Tc respectively. In other words, the bursts A, B are signals written to one track boundary Th of one track, and to the other track boundary Th of the one track, respectively. In addition, the bursts C, D are signals written in one track at constant intervals. One of them is written to an odd number track, and the other is written to an even number track. The positioning control of a read head 300a is performed so that the read head 300a is positioned, for example, to the track center Tc that is a position at which the read-signal amplitude of the burst A and that of the burst B are in balance with each other. The discrepancy in position of the head can be detected, for example, by an error signal that is generated in response to the sum of, or the difference between, values obtained by integrating absolute values of the amplitude or of waveforms, which can be obtained from read signals of the bursts A, B.

Methods for writing the burst patterns are two types, which will be described below. To be more specific, a method in which one burst pattern (e.g., burst A) is overwritten (or trimmed) by writing twice; and a method in which one burst pattern is written by writing once without overwriting (or without trimming). If one burst pattern is written by overwriting twice, a seamed part is formed in the one burst pattern. Therefore, this burst-pattern writing method by use of overwriting is called a seamed method in this specification. In addition, a servo pattern written by the seamed method is called a seamed servo pattern. Moreover, if a burst pattern is written without overwriting (without trimming), one burst pattern itself is written by one write operation. Accordingly, there is formed no seamed part. In this specification, this burst-pattern writing method without trimming is called a seamless method, and a servo pattern written by the seamless method is called a seamless servo pattern.

The servo-pattern writing method according to the seamed method and that according to the seamless method will be specifically described below. FIGS. 13 and 5 are schematic diagrams illustrating a servo-pattern writing method according to the seamed method and that according to the seamless method respectively. Servo data is written while a head is moved in the radial direction by a half track. In addition, the burst pattern has bursts A, B, C, D that are written at writing positions differing one after another in the direction in which a track extends.

As shown in FIG. 13, as for the seamed method, for example, in the n-th write operation in a servo track write (STW) process, a write head 300b first writes an ID indicating position information about a position of a track in a sequence, and the like, and then writes only the bursts A, C. To be more specific, a burst pattern is not written at positions of the burst B and D. At the positions of the burst B and D where no signal is written, if a signal has been written by the last servo write, the signal is erased (trimmed). Next, the write head 300b is moved only by a half track. Then, an ID is written, and subsequently the bursts B, C are written. At this time, as is the case with the above, data is erased (trimmed) at specified positions (here, at the positions of the bursts A and D).

Thus, one track is formed by the n-th and (n+1)-th servo writes. Because the track width Tw is usually wider than the width of the read head 300b, a burst pattern is written by overwriting and trimming in this manner. In this seamed method, overwriting servo data at the time of the (n+1)-th write operation to servo data at the time of the n-th write operation makes it possible to write a burst pattern having no gap between tracks adjacent to each other. Here, the bursts A through D are ideally written with their write positions being displaced from one another by a half track in the radial direction. The track center Tc is a position at which when reading the bursts A and B the read-signal amplitude of them are in balance with each other. The distance between the track centers Tc is a track pitch. In addition, a centerline of the two adjacent track centers Tc in the radial direction is a track boundary Tb, and the distance between the track boundaries Tb which are adjacent to each other is the track width Tw. As shown in FIG. 13, the track width Tw is ideally the same as the width of the bursts A through D.

On the other hand, as for the seamless method, as shown in FIG. 5, as is the case with the seamed method, a servo signal is written while a head is moved by a half track. However, one kind of burst pattern is written by one write operation. Since overwrite (trimming) is not performed, unlike the seamed method, for example, at the time of the n-th write (writing the burst A), the burst pattern written by the last write operation is not erased, and accordingly the burst pattern is not trimmed. Accordingly, a gap G is formed between the burst A and the burst B that have been written by the n-th and (n+2)-th write operations. To be more specific, since the width of a write head is usually narrower than the track width or the track pitch, unlike the seamed burst pattern, the width of each of the bursts A through D becomes narrower than the track width or the track pitch. As shown in FIG. 5(e), the track center Tc can be defined as, for example, a position at which the signal amplitude of the burst A and that of the burst B are in balance with each other.

As described above, in the servo track write process, servo data as track information is written so that the servo data can be used for the positioning control of the head. However, this track information may indicate the track width narrowing or widening depending on a position on the disk. In particular, in a hard disk in which TPI (tracks per inch) is increased as a result of the recent increase in recording density, a slight displacement of the track width causes a data position accessed by the head to be incorrect when the head writes data to a track or when the head reads data from the track, and consequently an error occurs.

Heretofore, such a track having an abnormal track width is detected in advance by a test process performed after a STW process. Then, the use of the detected track is disallowed. In order to achieve this, there is, for example, the following method: seeking to all tracks and temporarily writing data to the tracks; and reading out the written data to check whether or not an error occurs.

In addition, as another method, patent document 1 (Japanese Patent Laid-open No. 2003-331545) discloses the off-track avoiding method for avoiding an off-track phenomenon that is caused by nonuniformity in the track width written on a hard disk. As for the technology described in patent document 1, whether or not the track width is normal is judged by use of signals of A, B, C, and D burst areas included in each servo sector. If it is judged that the track width is abnormal, a servo signal of a track having the nonuniform width is erased, and a servo signal is then written by a servo writer again to form a new track.

The judgment as to whether or not the track width is normal is made by: reading a signal of a burst area twice in an off-track state; determining a first added value by adding, for example, a first absolute value T1, which is obtained by subtracting a signal of the burst D from that of the burst B, to a second absolute value T2, which is obtained by subtracting a signal of the burst D from that of the burst A; and checking whether or not the difference between the first added value and a specified value is within a constant range. This method will be further detailed below.

FIG. 14 is a schematic diagram illustrating a method for judging whether or not the track width is normal as described in patent document 1. In the track-width judgment method described in patent document 1, for example, if a track is an even number track at a track center position P101, a read head 300a is moved to P102, P103 that are respective positions moved from the track center position P101 by ¼ track in the radial directions (track width directions) opposite to each other (¼ off-track positions). Then, at the ¼ off-track position P102, an absolute value 332 of the difference between the burst A and the burst C is determined from the burst pattern that has been read out. Further, at the ¼ off-track position P103, an absolute value 333 of the difference between the burst B and the burst C is determined from the burst pattern that has been read out.

In addition, if a track is an odd number track, the read head 300a is moved to P105, P106 that are respective positions moved from a track center position P104 by ¼ track in the radial directions opposite to each other. Then, at the ¼ off-track position P105, an absolute value 335 of the difference between the burst B and the burst D is determined from the burst pattern that has been read out. Further, at the ¼ off-track position P106, an absolute value 333 of the difference between the burst A and the burst D is determined from the burst pattern that has been read out.

In the case of an even number track, the sum of the absolute value 332 and the absolute value 333 is determined; and in the case of an odd number track, the sum of the absolute value 335 and the absolute value 336 is determined. Each sum is then compared with a specified value. If the sum is larger than the specified value, it is judged that the width of the servo sector has increased; and if the sum is smaller than the specified value, it is judged that the width of the servo sector has decreased.

BRIEF SUMMARY OF THE INVENTION

However, although the invention described in patent document 1 can be applied to the above-mentioned seamed servo pattern, it is not possible to measure the width of a servo sector if the head width is less than 50% of the track width. In addition, if the invention described in patent document 1 is applied to the seamless servo pattern, the track width cannot be correctly measured. These problems will be specifically described below.

FIG. 15 is a diagram illustrating a method for measuring the servo sector width in a seamed servo pattern by use of a head, the head width of which is less than 50% of the track width, according to the conventional method. As shown in FIG. 15, even if servo data is written in the seamed method, the head width of the read head 310a may be less than 50% of the track width Tp. In this case, an absolute value 333 of the difference between the burst B and the burst C cannot be correctly measured, for example, at the ¼ off-track position P103 since the amplitude of the burst B exceeds a limit value.

Moreover, FIGS. 16(a) and 16(b) illustrate a problem that arises in the case where servo data is written by the seamless method. FIG. 16(a) corresponds to FIG. 14 illustrating the bursts A through D that are seamless servo patterns. As shown in FIG. 15(a), the width of the bursts A through D is narrower than the track width Tw, and accordingly there is a gap G between the burst A and the burst B. In this example, the track center Tc is a center between the burst A and the burst B. The head is positioned to the center between the burst A and the burst B.

In this case, as is the case with FIG. 14 described above, the read head 300a is moved to the ¼ off-track position P102 from the track center position P101, and then an absolute value 342 of the difference between the burst A and the burst C is determined from the burst pattern which has been read out. After that, the read head 300a is moved to the ¼ off-track position P103 in the direction opposite to the ¼ off-track position P102, and an absolute value 343 of the difference between the burst B and the burst C is then determined from the burst pattern which has been read out. FIG. 16(b) is a diagram illustrating the absolute values 342, 343, and the gap G in FIG. 16(a). As shown in FIG. 16(b), if such seamless servo patterns are used, the sum of the absolute value 342 and the absolute value 343 is outside the range of the servo sector width, in other words, the width of the gap G cannot be measured. Therefore, the servo sector width cannot be correctly measured, and the track width Tw also cannot be correctly measured.

On the other hand, if there is provided a method in which after the STW process, data is written to all tracks and the data is then read to detect a track where an error occurs, this method can be applied to both seamed and seamless servo patterns. However, since this is not a method in which abnormal track width is directly detected, that is, this is an indirect test, it may not be possible to avoid improper detection, a failure in complete detection, or the like, which is caused by an error other than the track width. Moreover, since data is temporarily written and is then read, there also arises a problem of taking an extremely long time to complete the test process. Furthermore, even if the method described in the above patent document 1 is applied, the measurement is performed twice at a ¼ off-track position to judge whether or not the track width is abnormal. Accordingly, there arises a problem of taking a long time to complete the test processing.

The present invention has been made to solve the above-mentioned problems. A feature of the present invention is to provide a disk unit, and a manufacturing method thereof, capable of detecting a track, the track width of which deviates from a normal value, with accuracy at high-speed.

According to one aspect of the present invention, there is provided a disk unit comprising: a head at least for reading data; a disk to which servo data including first second, third, and fourth burst patterns is written, the servo data being used to position the head to a track center; and a defective-track detecting part for detecting a target track to be judged, to which both the first and second burst patterns are written, as a defective track whose track width is abnormal if a compared value obtained on the basis of the result of reading the first and second burst patterns and either the third or fourth burst pattern by one read operation of the head is outside a specified range.

According to the present invention, it is possible to detect a defective track, the track width of which is abnormal, by use of the compared value obtained on the basis of the result of reading by one read operation the first and second burst patterns that are used to position the head to a track center. The defective-track detection, therefore, can be extremely speeded up.

In addition, the defective-track detecting part uses, as the track center, a position at which the result of reading the first burst pattern and the result of reading the second burst pattern are balanced with each other, and thereby detects the defective track from the result of reading by the head that has been positioned to the track center. The defective-track detecting part positions the head to the track center and then reads the first and second burst patterns in an on-track state, and can detect a defective track only from this result of reading the 4 burst patterns.

Moreover, the size of the first and second burst patterns in the track width direction can be kept constant regardless of the track width. If the size in the track width direction is kept constant regardless of the track width, a gap or an overlapped part is formed in a boundary part in the radial direction between the first and second burst patterns. Since the size of the gap or that of the overlapped part fluctuates in accordance with the track width, the fluctuations are reflected in the result of reading. Accordingly, it is possible to detect that the track width is abnormal.

Further, first and second burst data can be written without trimming. If a seamless burst pattern without trimming is used, the width of the burst pattern in the radial direction can be kept constant regardless of the track width.

In addition, a gap fluctuating in accordance with the track width may be formed in the track width direction between the first and second burst patterns. For example, if the first and second burst patterns are written without trimming, the width of a write head is usually narrower than the track width. Therefore, a gap is formed between the servo patterns, and the size of this gap fluctuates in accordance with the track width. Since the fluctuations are reflected in the result of reading, it is possible to detect that the track width is abnormal.

Moreover, the disk unit further comprises a compared-value calculation part for calculating a compared value. The defective-track detecting part can judge whether or not the track to be judged is a defective track on the basis of the result of comparison between a criterion used to judge whether or not the track width is abnormal and the compared value for the track to be judged. Thus, the defective-track detecting part can make use of the criterion to judge a track having a desired width to be a defective track.

Further, the first burst pattern is written to one track boundary of one track, and the second burst pattern is written to the other track boundary of the one track.

In addition, the head can be positioned to a position at which the read-signal amplitude of the first burst pattern is equivalent to that of the second burst pattern. This position is treated as a track center.

Moreover, the compared-value calculation part can calculate the compared value on the basis of the sum of the read-signal amplitude of the first burst pattern and that of the second burst pattern. For example, in the case where burst patterns such as seamless servo patterns are written at constant intervals regardless of the track width, if the track width is normal, a gap is formed between the first burst pattern and the second burst pattern. Otherwise, the first and second burst patterns form an overlapped part in the radial direction. In this case, if the track width becomes wider than a normal value, the gap becomes wide, or the overlapped part becomes narrow. On the other hand, if the track width becomes narrower, the gap becomes narrow, or the overlapped part becomes wide. In this manner, the compared value changes in accordance with the track width. Accordingly, measuring this makes it possible to detect that the track width is abnormal.

Further, the servo data refers a 3rd burst pattern written to an odd number track and 4th burst pattern written to even number track. The compared-value calculation part can calculate the compared value on the basis of the result of reading the first and second burst patterns and the third or fourth burst pattern. For example, the compared-value calculation part can use, as the compared value, a value obtained by dividing the sum of the read-signal amplitude of the first burst pattern and that of the second burst pattern by the read-signal amplitude of the third burst pattern or that of the fourth burst pattern. Thus, dividing by the read-signal amplitude of the third burst pattern or that of the fourth burst pattern makes it possible to determine a more correct compared value.

Moreover, the disk unit further comprises a criterion calculation part for calculating a criterion used to determine the specified range on the basis of the compared value. In this case, the criterion calculation part can use, as the criterion, a mean value of the compared values of the given number of tracks, excluding the defective track, among the compared values calculated by the compared-value calculation part. Thus, the criterion can be obtained from the mean value.

Moreover, if a track to be judged is an odd number track, the criterion calculation part can use, as the criterion, a mean value of the compared values of the given number of odd number tracks, excluding the defective track, among the compared values calculated by the compared-value calculation part. On the other hand, if a track to be judged is an even number track, the criterion calculation part can use, as the criterion, a mean value of the compared values of the given number of even number tracks, excluding the defective track, among the compared values calculated by the compared-value calculation part. Thus, grouping the tracks into the odd number tracks and the even number tracks makes it possible to calculate a more correct criterion.

Further, the criterion calculation part can calculate the criterion on the basis of the compared values of tracks in proximity to the track to be judged. Since the servo burst width differs between the inner and outer circumferential sides of a disk due to angle of MR head (gap between read and write element), it makes variation of the criterion, calculating a criterion from compared values of tracks in proximity to a track to be judged makes it possible to obtain a correct criterion.

In addition, after judging the track to be judged, the criterion calculation part can update the criterion on the basis of the result of the judgment. For example, if the track to be judged is not a defective track, the criterion calculation part determines the mean value from the compared values of the given number of tracks including the track to be judged in question, and then updates the criterion. Thus, successively updating the criterion makes it possible to obtain a correct criterion with high efficiency.

Moreover, the defective-track detecting part can store the defective track in a defect table. In this case, for example, there is further provided a write control part for controlling data write by the head by referring to the defect table. The write control part refers to the defect table, and disallows write to the defective track. For example, if the defect table is written to a given area on a disk, the write control part refers to this at the time of writing, and the write control is then performed so that data is written while skipping a defective track that has been detected by a defective-track test. Thus, the use of the defective track can be disallowed in advance.

Furthermore, the defective-track detecting part can store a cylinder having the defective track in a defect table as a defect cylinder, and thereby can disallow the use of the defective track on a cylinder basis.

According to another aspect of the present invention, there is provided a disk unit comprising: a disk to which servo data including first and second burst patterns is written, the first and second burst patterns being written with the size in the track width direction being kept constant regardless of the track width, the servo data defining, as a track center, a position at which a result of reading the first burst pattern and a result of reading the second burst pattern are balanced with each other; a head at least for reading data; and a defective-track detecting part for detecting a defective track in which a compared value obtained from a result of reading at a position at which both the first and second burst patterns are read by one read operation of the head is outside a specified range.

According to embodiments of the present invention, the first and second burst patterns are written with the size in the track width direction being kept constant regardless of the track width. Therefore, if the track width is abnormal, in contrast to the case where the track width is normal, the distance from the first burst pattern to the second burst pattern fluctuates. This is because a gap, or an overlapped part, in the radial direction between the first burst pattern and the second burst pattern fluctuates. Here, once burst data is read at a position at which both the first and second burst patterns are read, the size of the gap or that of the overlapped part is reflected in the result of reading. Accordingly, checking whether or not this value is normal makes it possible to detect that the track width is abnormal. The defective-track detection, therefore, can be extremely speeded up.

According to still another aspect of the present invention, there is provided a disk-unit manufacturing method for manufacturing a disk unit comprising: a head at least for reading data; and a disk to which servo data including first and second burst patterns is written, the servo data being used to position the head to a track center, the disk-unit manufacturing method comprising the steps of: calculating a compared value on the basis of the result of reading first and second burst patterns by one read operation of the head; if the compared value is outside a specified range, judging that a track to be judged to which both the first and second burst patterns are written is a defective track; and disallowing the use of the defective track in advance.

According to embodiments of the present invention, the disk unit can detect by itself a defective track, in which an abnormal condition of the track width on the disk occurred after servo patterns have been written, only by reading the servo patterns once by use of a self test, and can disallow the use of the detected defective track. Accordingly, the test processing of the track width is extremely speeded up. In addition, because the use of the defective track is disallowed, it is possible to provide a disk unit in which an error such as off-track seldom occurs during the use.

Moreover, the defect table is written to a specified area on the disk, it is possible to disallow the use of a defective track in advance. Accordingly, when writing of user data on the disk, it is possible to disallow the use of the defective track by referring to the defect table.

Still further, servo data is written to the disk, and the written servo data is read to detect the defective track. Accordingly it is possible to disallow the use of the detected defective track in advance. Therefore, using not only a self test but also self servo write makes it possible to further improve the productivity.

According to the present invention, it is possible to detect a track, the track width of which deviates from a normal value, with accuracy at high-speed.

BRIEF DESCRIPTION OF THE DRAWINGS

FIG. 4(a) is a schematic diagram illustrating an example of servo data; and FIG. 4(b) is a diagram illustrating bursts A, B, C, D according to the seamless method.

FIG. 12(a) is a schematic diagram illustrating an example of servo data; and FIG. 12(b) is a diagram illustrating bursts A, B, C, D according to the seamed method.

DETAILED DESCRIPTION OF THE INVENTION

Specific embodiments according to the present invention will be described in detail with reference to drawings below. In one embodiment, the present invention is applied to a hard disk drive, and a manufacturing method thereof. The hard disk drive has a seamless servo pattern, and disallows the use of a defective track (that is, a track whose track pitch is badly balanced) by detecting the defective track, the track width of which deviates from a normal value, and then storing information about the defective track on a disk.

Figure 1:
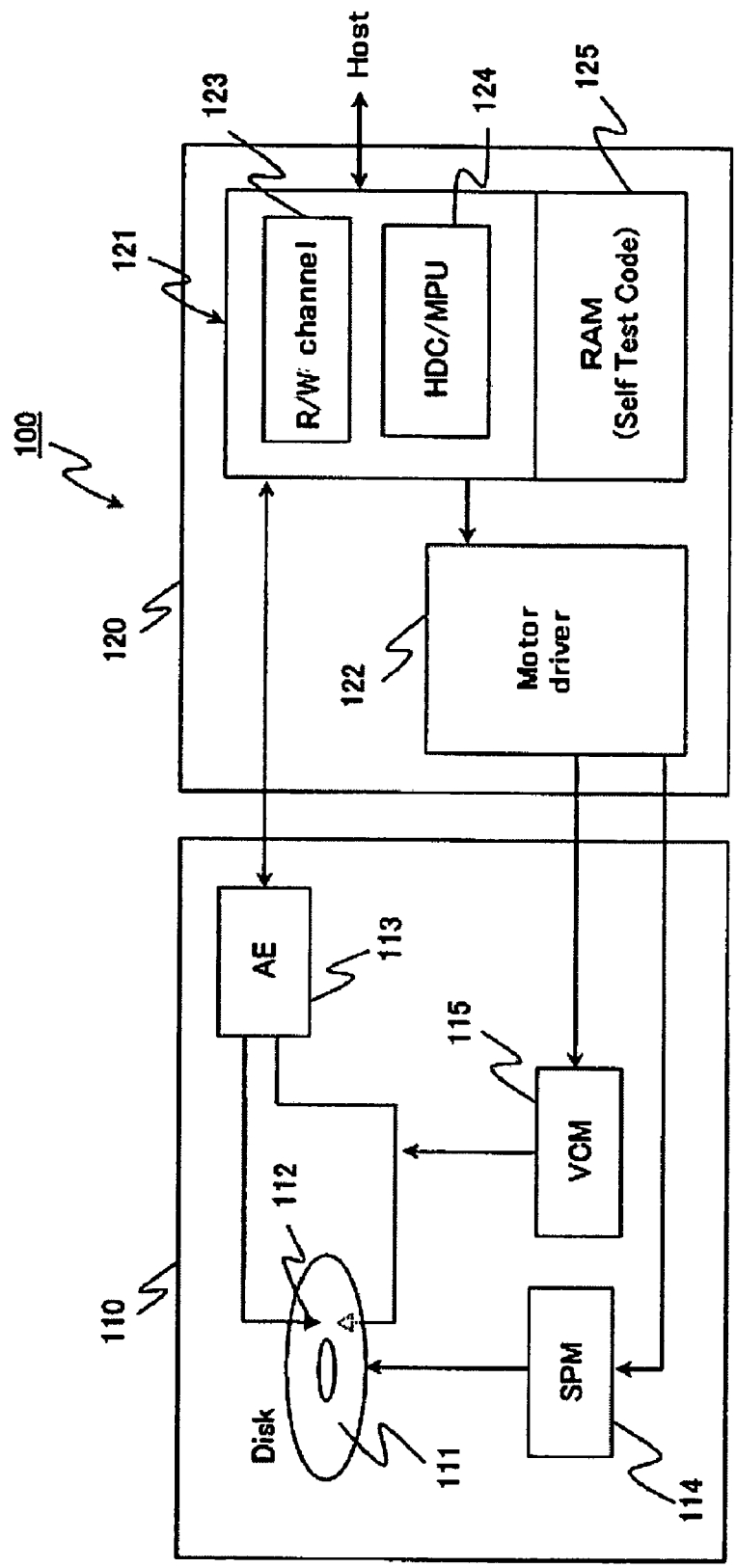
FIG. 1 is a block diagram schematically illustrating a configuration of a HDD according to an embodiment of the present invention.

FIG. 1 is a schematic diagram illustrating a configuration of a hard disk drive (HDD) 100 according to this embodiment. As shown in FIG. 1, the HDD 100 comprises in a cabinet 110: a magnetic disk 111 that is an example of a medium; a head element 112 that is an example of a head; arm electronics (AE) 113; a spindle motor (SPM) 114; and a voice coil motor (VCM) 115. The HDD 100 also comprises a circuit board 120 that is secured outside the cabinet 110. The circuit board 120 is provided thereon with a motor driver unit 122, and a signal processing circuit 121 for exchanging a signal with the AE 113 and with an external host. The signal processing circuit 121 comprises a read/write channel (R/W channel) 123, a hard disk controller (HDC)/MPU integrated circuit (hereinafter referred to as HDC/MPU) 124, and a RAM 125 that is an example of a memory. The R/W channel 123, the HDC/MPU 124, and the RAM 125 constitute one package.

Write data from the external host is received by the HDC/MPU 124, and is sent through the R/W channel 123 and the AE 113 before the write data is written to the magnetic disk 111 by the head element 112. In addition, data stored on the magnetic disk 111 is read out by the head element 112, and the read data is sent through the AE 113 and the R/W channel 123 before the read data is output from the HDC/MPU 124 to the external host.

Figure 2:
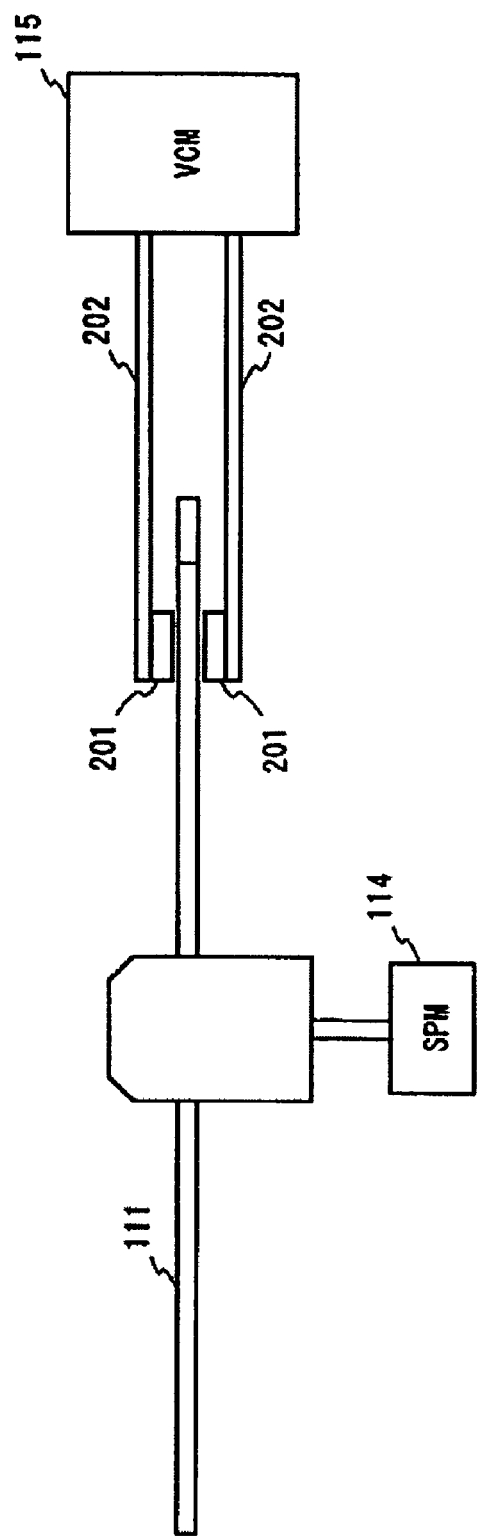
FIG. 2 is a diagram schematically illustrating a magnetic disk, and a driving mechanism of a head element, according to the embodiment of the present invention.

Next, each component of the HDD will be described. To begin with, the magnetic disk 111, and a driving mechanism of the head element 112, will be outlined with reference to FIG. 2. The magnetic disk 111 is secured to a rotating shaft of the SPM 114. The SPM 114 is driven by the motor driver unit 122 to rotate the magnetic disk 111 at a specified speed. The magnetic disk 111 has recording surfaces on both sides, to which data is written. Each head element 112 is disposed to face a corresponding recording surface (refer to FIG. 1). Each head element 112 is secured to a slider. The slider is secured to a carriage 202. The carriage 202 is secured to the VCM 115. The VCM 115 pivotally moves the slider 201 and the head element 112.

With the object of reading/writing data from/to the magnetic disk 111, the carriage 202 moves the head element 112 to a position above a data area of the rotating magnetic disk 111. As the carriage 202 pivotally moves, the head element 112 moves in the radial direction of the magnetic disk 111 over its surface. This allows the head element 112 to access a desired track.

In the head element 112, a write head and a read head are typically combined in one unit. The write head is used to convert an electric signal into a magnetic field according to data to be stored in the magnetic disk 111; and the read head is used to convert a magnetic field received from the magnetic disk 111 into an electric signal. To be more specific, with recent increase in recording density, for example, the following heads are used: the MR head that uses magnetoresistive effect (Magneto Resistive: MR); and the GMR head that uses giant magnetoresistive effect (Giant Magneto Resistive: GMR). In addition, as a head having a superior effect of suppressing the thermal asperity (Thermal Asperity: TA) caused by coming into contact with a medium, the thin film MR read/write combined head (MR head) is used. This thin film MR read/write combined head (MR head) uses as a read head the DSMR (Dual Stripe Magneto Resistive) head formed of two MR elements, or the like, and performs writing by a thin film head.

By balancing the pressure produced by air viscosity between the rotating magnetic disk 111 and an ABS (Air Bearing Surface) of the slider 201, which faces the magnetic disk 111, against the force applied by the carriage 202 in a direction toward the magnetic disk 111, the head element 112 flies over the magnetic disk 111 with a constant gap kept therebetween. It is to be noted that the required number of the magnetic disks 111 may be one or more, and that a recording surface may be formed on one side, or both sides, of the magnetic disk 111.

Next, each circuit component will be described with reference to FIG. 1. The AE 113 selects from among the plurality of head elements 112 one head element 112 that is used to access data, and amplifies (preamplifies) at constant gain a read signal read by the selected head element 112, before transmitting the signal to the R/W channel 123. In addition, the AE 113 sends a write signal, which is received from the R/W channel 123, to the selected head element 112.

The R/W channel 123 performs write processing of data obtained from the host. In the write processing, the R/W channel 123 performs code modulation of write data supplied from the HDC/MPU 124, and then converts the code-modulated write data into a write signal (electric current) to supply the write data to the AE 113. In addition, when supply of data to the host, read processing is performed.

In the read processing, the R/W channel 123 amplifies a read signal supplied from the AE 113 so that the amplitude can be kept constant, and then extracts data from the obtained read signal to perform decode processing. Data to be read out includes user data and servo data. The decoded read data is supplied to the HDC/MPU 124. In this embodiment, a read signal read by the R/W channel 123 is in particular used for checking whether or not the track width described below is normal, in other words, checking whether or not the track pitch balance is normal (hereinafter referred to as defective-track detection).

The HDC/MPU 124 is a circuit having a MPU and a HDC which are integrated into one chip. The MPU operates according to microcodes loaded into the RAM 125, and executes not only the total control of the hard disk drive 100 including the positioning control, interface control, and defect control of the head element 112, but also the defective track detection processing described below, and processing required for data processing. When the hard disk drive 100 is started, not only microcodes to operate on the MPU but also data required for control and data processing are loaded into the RAM 125 from the magnetic disk 111 or a ROM (not shown in the figure).

The defective-track detection checks whether or not the track width is locally too wide, and whether or not the track width is locally too narrow, and then stores a defective track, the track width of which is not normal, in a defect table that is written to a specified area on the disk 111. The track width is determined by burst patterns (servo burst) that are included in servo data written to the disk 111. In a manufacturing process, after writing burst patterns, the defective-track detection is executed by the apparatus itself as a test process (self test) of the burst patterns. When writing data, the HDD 100 refers to the defect table, and thereby controls the writing so that the data will not been written to the defective track that has been stored in the defect table.

During execution of this defective-track detection, a flag for starting test processing is set on the disk 111. When the power is turned on, a test processing program (self test code) is read out from the disk 111, and is then loaded into the RAM 125 through the AE 113, the R/W channel 123, and the HDC/MPU 124. After that, the test processing program is executed. This test processing will be described in detail later.

In addition, the HDC/MPU 124 has an interface function of interfacing with the host so as to receive user data, and commands such as a read command and a write command, which are transmitted from the host. The received user data is transferred to the R/W channel 123. Read data, which has been read from the magnetic disk 111, is acquired by the R/W channel 123, and is then transmitted to the host. Further, the HDC/MPU 124 executes error checking and correction (ECC) processing of user data, which has been obtained from the host, or which has been read out from the magnetic disk 111.

The data read out by the R/W channel 121 includes not only the user data but also servo data. The HDC/MPU 124 uses the servo data to perform positioning control of the head element 112. Control data from the HDC/MPU 124 is output to the motor driver unit 122. The motor driver unit 122 supplies the VCM 115 with driving current in response to a control signal. Moreover, the HDC/MPU 124 uses the servo data to control processing of reading/writing data. In particular, in this embodiment, the HDC/MPU 124 executes the defective-track detection by use of the servo data obtained from the R/W channel 123.

Figure 3:
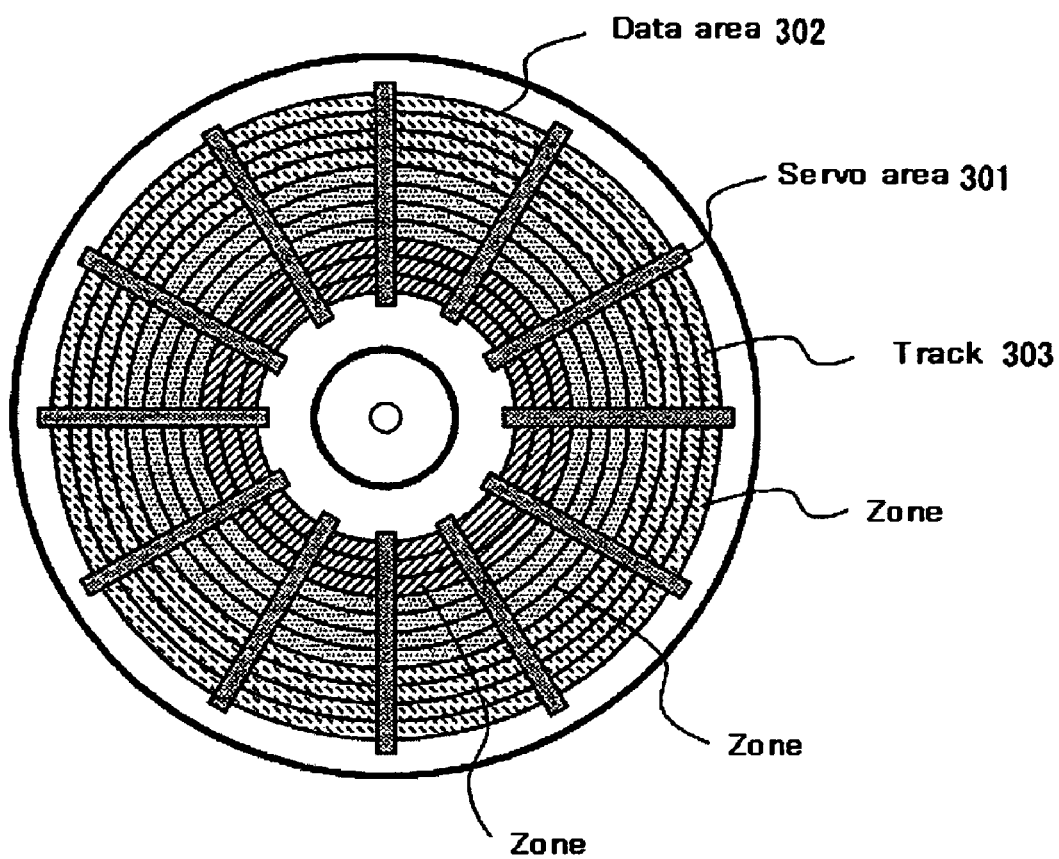
FIG. 3 is a schematic diagram illustrating a state of write data on a recording surface of a magnetic disk according to the embodiment of the present invention.

Write data on the magnetic disk will be described with reference to FIG. 3. FIG. 3 is a schematic diagram illustrating a state of write data on a recording surface of the magnetic disk 111. As shown in FIG. 3, on the recording surface of the magnetic disk 111, a plurality of servo areas 301 are formed at intervals of a specified angle. Each of the servo areas 301 radially extends in the radial direction from the center of the magnetic disk 111. There are also provided a plurality of data areas 302, each of which is formed between two adjacent servo areas 301. Thus, the servo areas 301 and the data areas 302 are alternately arranged at intervals of the specified angle. Servo data used for the positioning control of the head element 112 is written to each servo area 301. The user data is written to each data area 302.

Additionally, a plurality of tracks 303, each of which has a given width in the radial direction, are concentrically formed on the recording surface of the magnetic disk 111. The servo data and the user data are written along the track 303. One track 303 between the servo areas 301 includes a plurality of data sectors (the unit of writing user data). In addition, the tracks 303 are grouped into a plurality of zones according to their positions in the radial direction of the magnetic disk 111. The number of sectors included in one track 303 is set in each zone. FIG. 3 illustrates three zones. Changing a recording frequency on a zone basis enables improvement in recording density.

Next, servo data which is written to a servo area of the magnetic disk 111 will be described. Servo data used to follow a concentric track is written to the magnetic disk 111 that is a recording medium of a magnetic head used for writing data. The servo data is written to a plurality of positions on a track. As shown in FIG. 4(a), the servo data is formed of well-known areas including: a Sync part D1 to which Sync data used for data synchronization is written; a STM (Servo track mark) part D2 to which a servo mark indicating the start of the servo data is written; a track ID part D3 having position information indicating a position of a track in a sequence; and a Burst part D4 to which a burst pattern used for fine position control is written. The Sync part D1 includes servo AGC (Automatic Gain Control) that adjusts an amplification factor of a signal amplifier to keep the amplitude constant before reading out of servo data.

For example, as shown in FIG. 4(b), the burst pattern which is written to the Burst part D4 is formed of four kinds of burst patterns, that is, bursts A, B, C, D. Those burst patterns are read by the head, and then the change in amplitude of the read signal (burst signal) is digitized. The digitized change is used for tracking control (track following) of the head element, or the like.

As shown in FIG. 4(b), the burst A is a signal written to one track boundary Tb of one track, and the burst B is a signal written to the other track boundary Tb of the one track in question, where reference character Tc is the track center, Tb is the track boundary, and Tw is the track width. In addition, the burst C and the burst D are signals that are written to an odd number track or an even number track respectively in one track.

For example, the positioning control of a read head 112a is performed so that a position at which the signal amplitude obtained when reading of the burst A and that obtained when reading of the burst B are balanced with each other is used as the track center Tc. The discrepancy in position of the head can be controlled by an error signal that is generated in response to the difference in amplitude of the servo signal, for example, between the bursts A and B. In addition, an integration value of a waveform of a read signal in a burst pattern may also be used. The read head 112a can also be positioned by use of the bursts C and D.

Moreover, as shown in FIG. 4(b), the magnetic disk 111 in this embodiment does not overwrite at the time of servo track write, and accordingly a burst pattern according to the seamless method is formed without trimming. Further, in this embodiment, the HDD 100 does not write servo data to the disk 11 1 by use of a servo writer. Instead of it, the HDD 100 writes servo data by itself using the so-called self-servo write method. With the increase in the number of tracks per recording surface of one disk (track density), the higher accuracy of a servo writer is required, and the write time of the servo writer proportionally increases. Therefore, if the servo track write which uses a servo writer is adopted, it is necessary to equip a clean room with an expensive servo writer having the desired accuracy in writing over many manufacturing cycles. In contrast to this, the self-servo write improves the productivity of HDDs and facilitates the manufacturing. It is to be noted that servo data may also be written by the servo writer.

Figure 5:
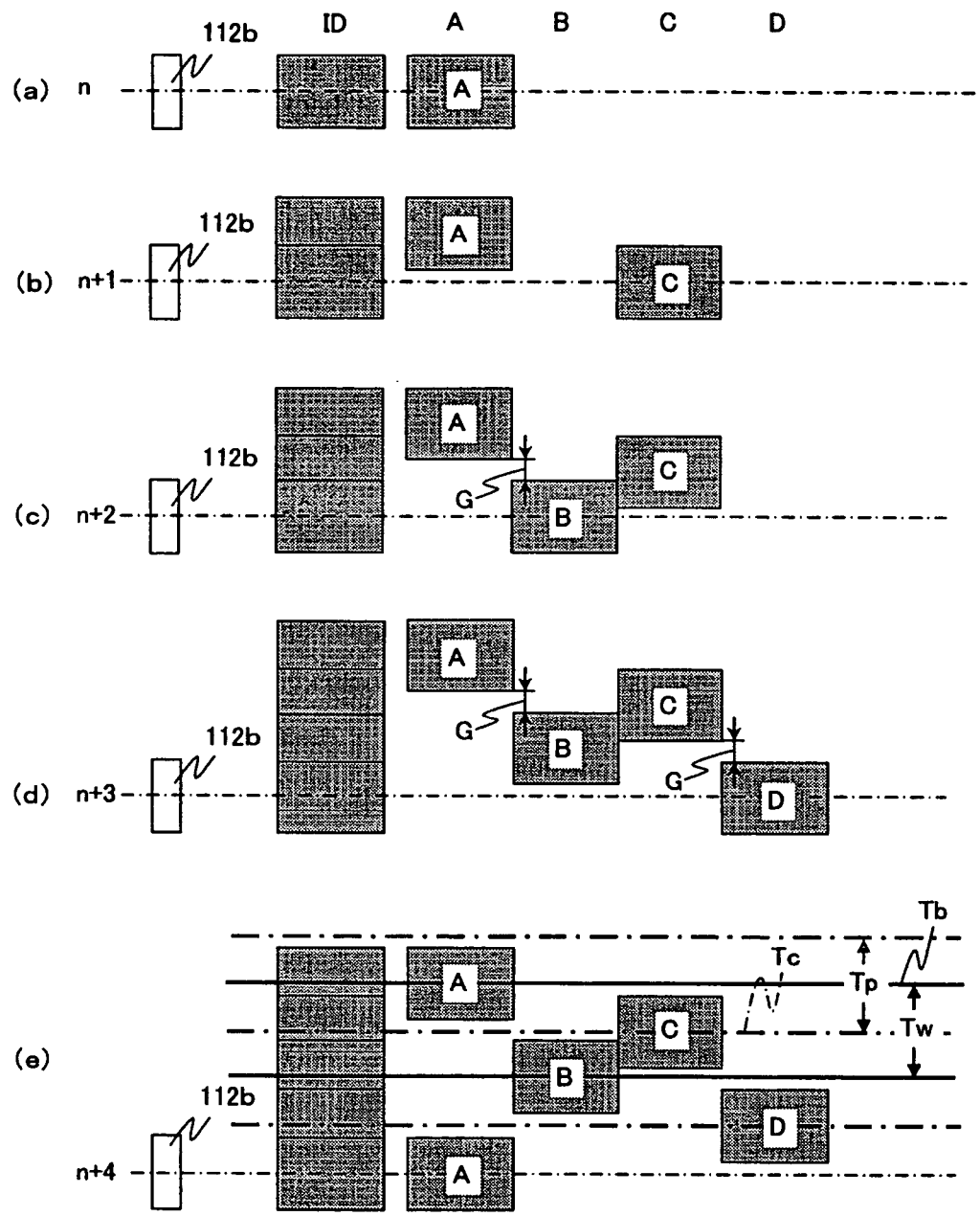
FIG. 5 is a schematic diagram illustrating a writing method for writing a servo pattern by the seamless method.

As described above, in the servo track write process, a burst pattern is written by the seamless method. Accordingly, overwrite trimming of a burst pattern is not performed. To be more specific, as shown in FIG. 5, in the seamless method, a servo signal is written while the head is moved by a half track in the radial direction (track width direction). Although this point is similar to the seamed method, only one kind of burst pattern is written as a result of writing once, and a burst pattern is not trimmed by overwriting.

As shown in FIG. 5(a), for example, in the n-th servo write, a write head 112b first writes an ID indicating location information about a position of a track in a sequence, and the like, and then writes only the burst A. Next, as shown in FIG. 5(b), at a position to which the head is moved by a half track in the radial direction, only the burst C is written by the (n+1)-th servo write. In a similar manner, as shown in FIG. 5(c), the head is further moved by a half track and the (n+2)-th servo write is performed there to write the burst B; and as shown in FIG. 5(d), the head is further moved by a half track and the (n+3)-th servo write is performed there to write the burst D.

Figure 13:
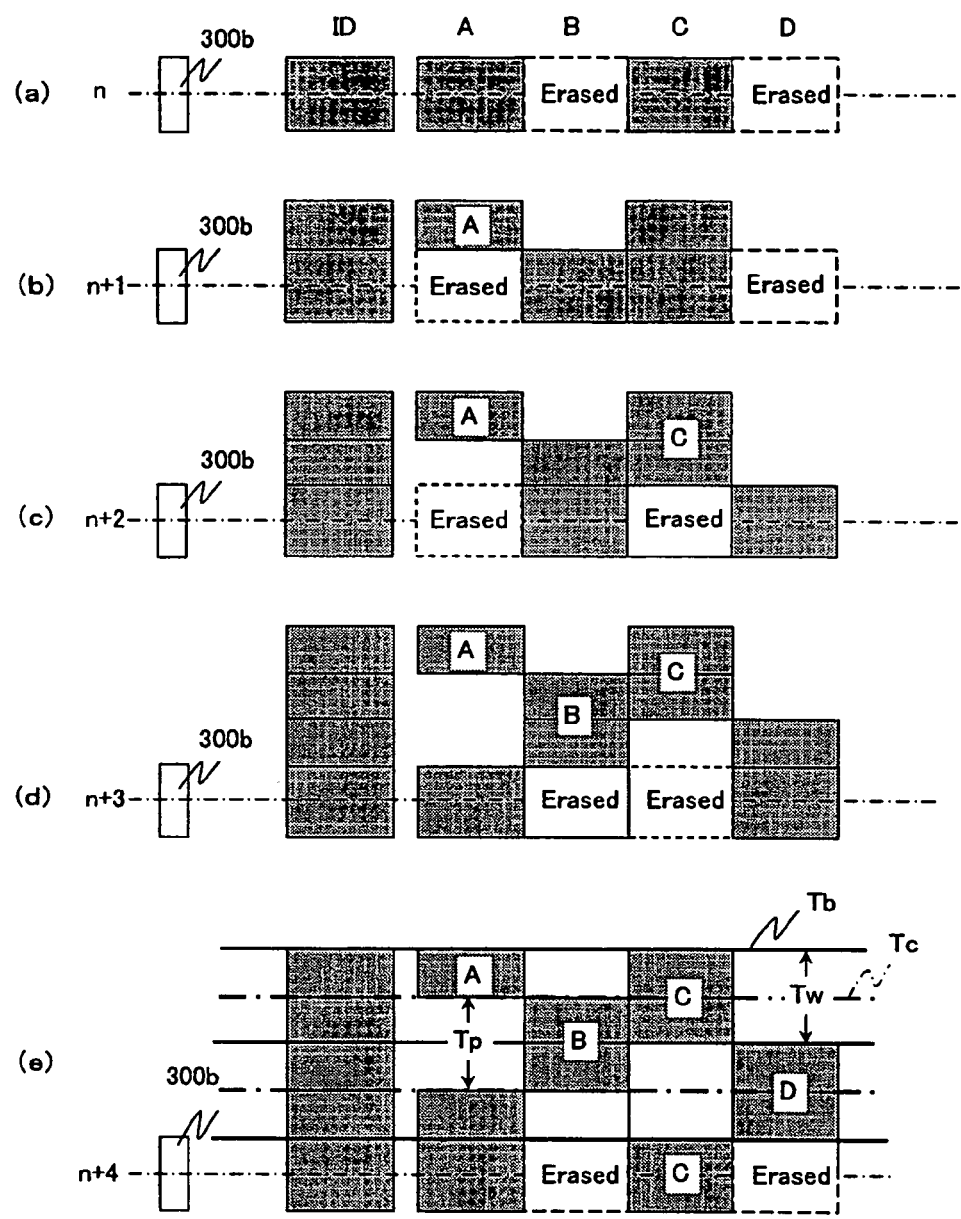
FIG. 13 is a schematic diagram illustrating a writing method for writing a servo pattern by the seamed method.
Figure 14:
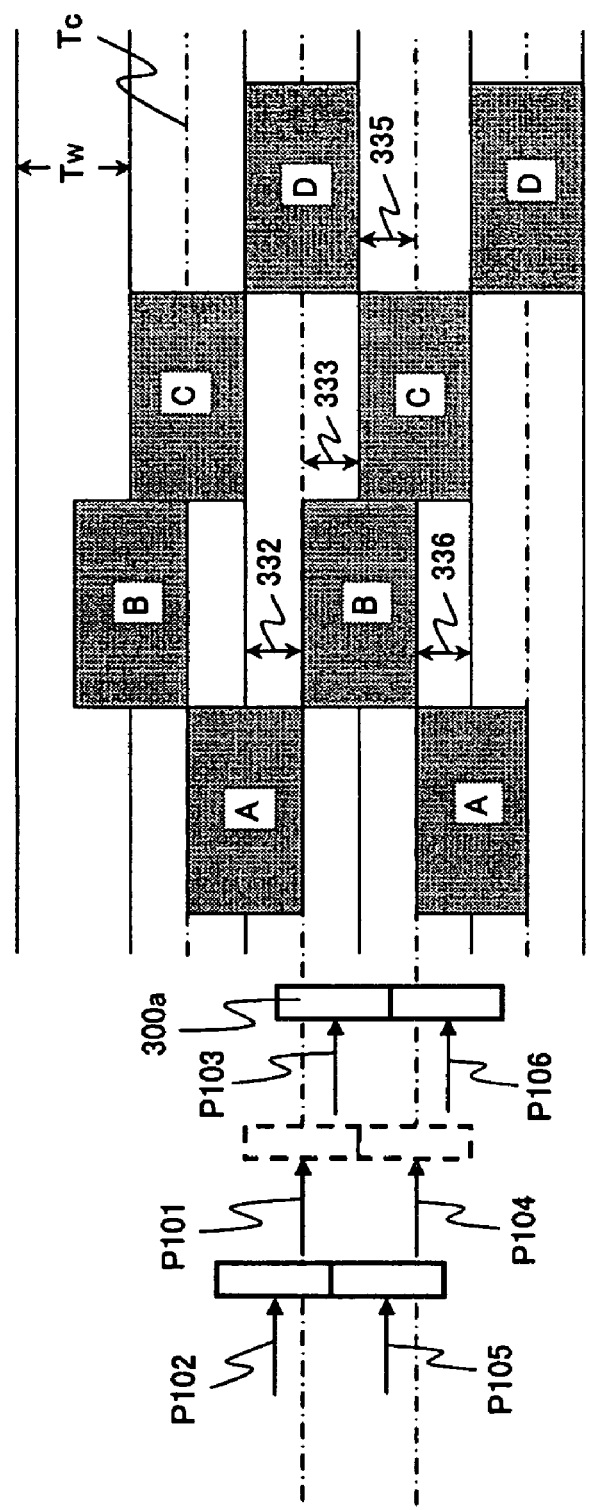
FIG. 14 is a diagram illustrating a method for judging whether or not the track width is normal, the method being described in patent document 1, and bursts A through D being seamed servo patterns.
Figure 15:
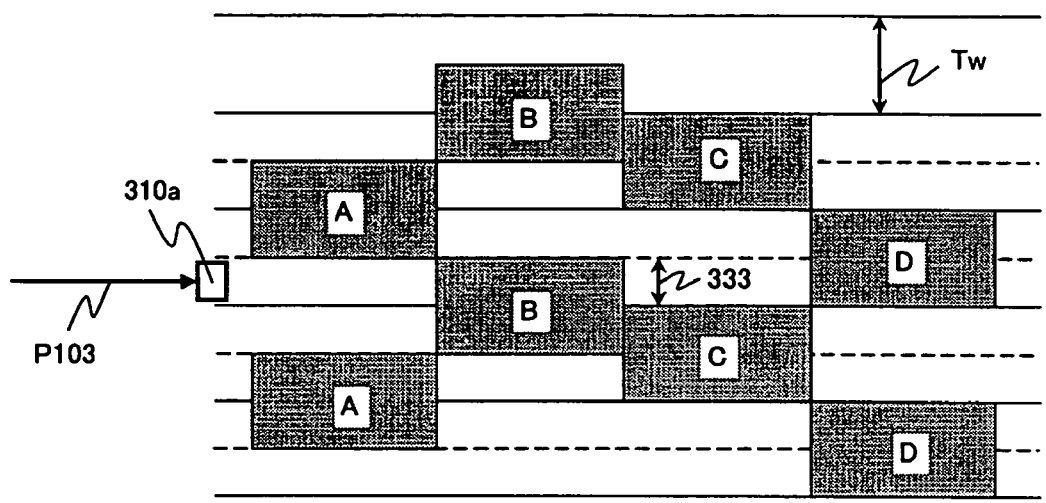
FIG. 15 is a diagram illustrating a method for measuring the servo sector width in a seamed servo pattern by use of a head, the head width of which is less than 50% of the track width, according to the method described in patent document 1.
Figure 16:
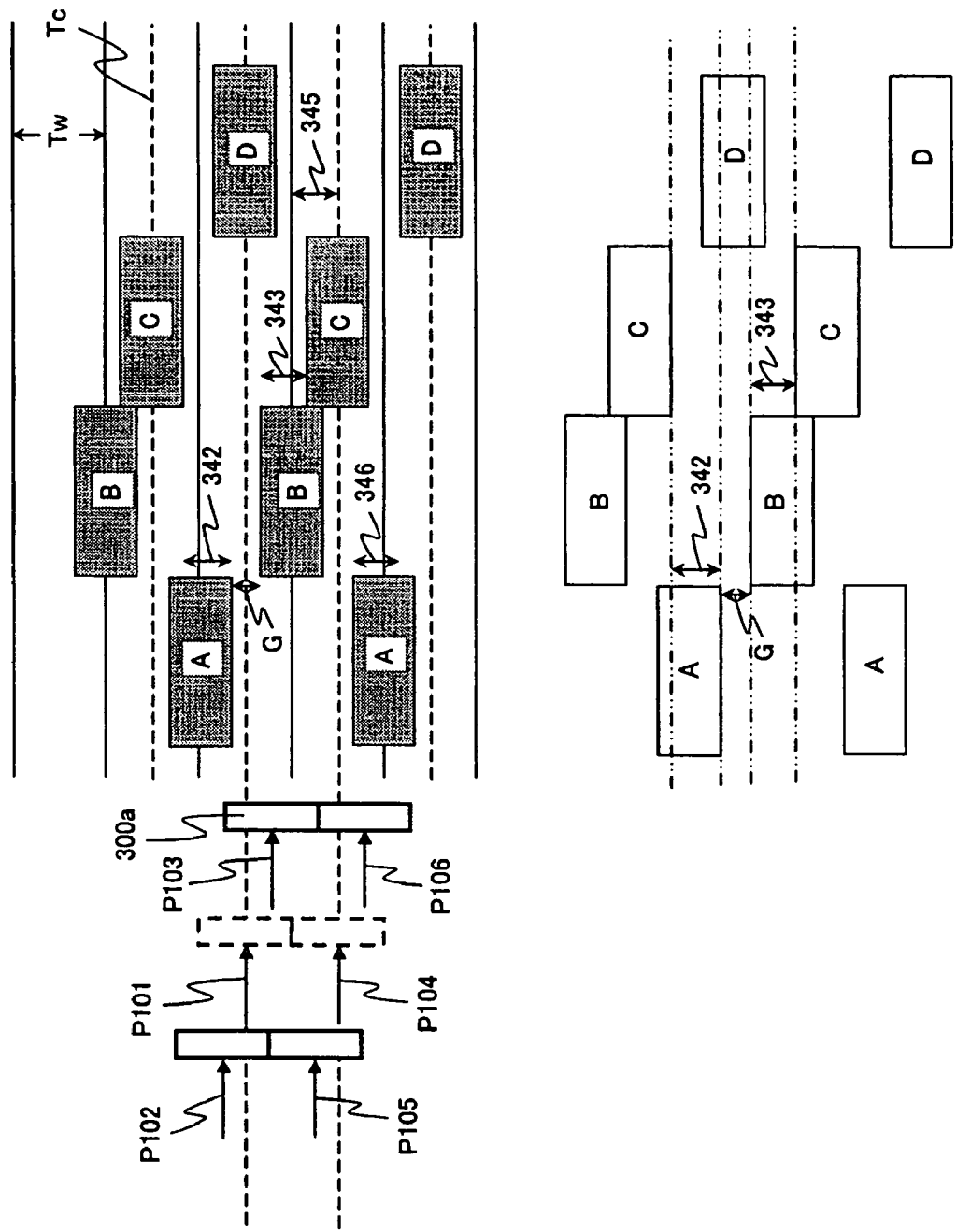
FIG. 16 is a diagram illustrating a method for judging whether or not the track width is normal, the method being described in patent document 1, and bursts A through D being seamless servo patterns.

In this case, in contrast to the seamed method, one kind of burst pattern is written as a result of servo writing once, and trimming which erases other burst patterns at the time of writing one burst pattern is not performed. Thus, one burst pattern is written as a result of servo writing once, and in contrast to the seamed method, trimming is not performed. Therefore, it is not possible to write in succession to a burst pattern (seamless). In addition, since the track width Tw and the track pitch Tp are each usually wider than the width of the write head 112b, a burst pattern is not written up to the maximum of the track width Tw or of the track pitch Tp unlike a seamed servo pattern shown in FIG. 13. Accordingly, a gap G is formed between the burst A and the burst B, and between the burst C and the burst D. The burst pattern which has been written in this manner is read by the read head. Then, the head is positioned so that a position at which the signal amplitude of the burst A and that of the burst B are balanced with each other is used as the track center Tc (FIG. 5(e)).

Incidentally, in the servo track write process, servo data is written while the write head 112b is displaced by a half track in the radial direction. However, the burst pattern is written by only one write without overwrite. Accordingly, the width of each burst pattern in the track width direction becomes constant, more specifically, it is the width of the write head 112b. Here, in the track where a servo pattern has been written, a position at which the read-signal amplitude of the burst A is the same as that of the burst B (that is, a balanced position) is defined as a track center Tc; and the distance between two track centers Tc that are adjacent to each other is defined as a track pitch Tp. In addition, the middle point between the two adjacent track centers Tc is defined as a track boundary Th; and the distance between two track boundaries Tb that are adjacent to each other is defined as a track width Tw.

Although the track width Tw or the track pitch Tp is determined by burst data including this burst pattern, slight displacement of the track width Tw results in an incorrect data position accessed by the head when the write head 112b of the HDD writes data to the track, or when the read head 112a reads data from the track. For the purpose of avoiding this problem, the manufacturing process of the HDD 100 has a defective-track detection that checks after this servo-data writing process whether or not the track width Tw determined by the servo data is normal, or whether or not the balance of the track pitch Tp is normal.

In this embodiment, this check process directly measures the track width Tw of each track. Then, if a defective track, the track width of which is abnormal, is detected in the check process, a cylinder including the defective track is stored as a defect cylinder in an alternate cylinder table (hereinafter referred to as a defect table) that is provided on the disk. The HDD 100 has a function of, when using a write area of the magnetic disk 111, referring to this defect table, and thereby skipping a cylinder stored in the defect table before accessing the write area. Accordingly, by storing the detected defective track in the defect table, it is possible to prevent data from being written to the defective track.

Incidentally, the above defect table is used to store a cylinder having a defective track as a defect cylinder so that the use of the stored defect cylinder is not allowed. However, as a matter of course, the defect table may also be configured to store a defective track instead of a defect cylinder.

Here, the HDD 100 in this embodiment does not depend on an inspection apparatus. Specifically, after the HDD 100 writes servo data by itself, the inspection apparatus can execute a self test by itself. As described above, during execution of the test processing, a flag for starting the test processing is set on the disk 111. When the power is turned on, the test processing program (self test code) is read out from the disk 111, and is then loaded into the RAM 125 through the AE 113, the R/W channel 123, and the HDC/MPU 124. After that, the test processing program is executed.

Figure 6:
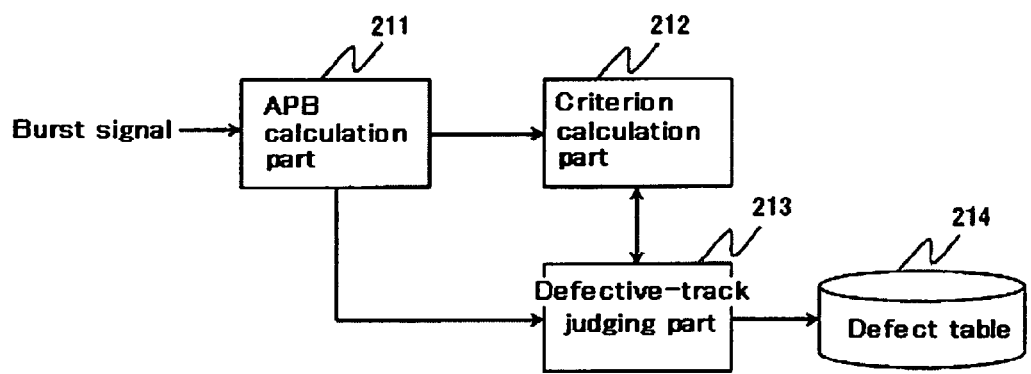
FIG. 6 is a functional block diagram illustrating test processing executed in a HDC/MPU of a HDD according to the embodiment of the present invention.

FIG. 6 is a functional block diagram illustrating the test processing that is executed in the HDC/MPU 124 shown in FIG. 1 in this embodiment. To be more specific, the HDC/MPU 124 of the HDD 100 functions as an abnormal track-width test processing unit. As shown in FIG. 6, a read signal (burst signal) of a burst pattern read by the head, which is positioned by the bursts A through D (included in servo data) written without trimming by the seamless method, is inputted through the R/W channel 123 shown in FIG. 1. Here, functions of the test processing include the following: an APB calculation part 211 for calculating APB (A Plus B) as a compared value described below on the basis of the signal amplitude of the bursts A through D; a criterion calculation part 212 for, on the basis of the compared value, calculating a criterion Cr used to judge whether or not the track width is abnormal; and a defective-track judging part 213 for, on the basis of the result of comparing the criterion Cr with the compared value in a track to be judged, judging whether or not the track to be judged is a defective track. A track which has been judged to be a defective track is stored in the defect table 214.

As described above, since the burst pattern in this embodiment is written by the seamless method, there are gaps G between the burst A and the burst B, and between the burst C and the burst D. The head element 112 (refer to FIG. 1) has the write head 112b for writing (refer to FIG. 5) and the read head 112a for reading (refer to FIG. 4(b)). A burst pattern is read by the read head 112a in the head element 112, and the positioning control of the head is performed on the basis of this read signal. The track center Tc is a position at which the read-signal amplitude of the burst A balances with that of the burst B (A=B).

The amplitude at the time of reading the bursts A and B is equivalent to that at the time of reading the burst C or the burst D. If the amplitude of the burst A through D are defined as A through D, (A+B)/C or (A+B)/D (hereinafter referred to as (A+B)/(C or D) or APB) becomes a constant value, for example, 1.0, if the track width is constant. It is to be noted that how to divide, that is, dividing by the amplitude C of the burst C or dividing by the amplitude D of the burst D, is determined by whether the track is an even number track (cylinder) or an odd number track (cylinder). The burst signal is inputted into the APB calculation part 211 where the APB is successively calculated for each track. As for the calculation of APB, if there are provided a plurality of recording surfaces and the plurality of read heads 112*a*, for example, after calculation of all APBs for one cylinder, APB for the next cylinder is calculated.

If the track width is constant, the sum of the amplitude of the burst A and that of the burst B becomes constant. However, with the increase in track width, a gap between the burst A and the burst B becomes larger, and the sum of the amplitude, A+B, becomes smaller. In contrast to this, with the decrease in track width, a gap between the burst A and the burst B becomes smaller, and the sum of the amplitude, A+B, becomes larger. In addition, if the track width further decreases to such an extent that the burst A partially overlaps with the burst B in the radial direction, the sum of the amplitude, A+B, further increases. In other words, the size of the gap G fluctuates in accordance with the track width, and these fluctuations are reflected in the sum of the amplitude, A+B. In this embodiment, this is used to measure the track width so as to detect that the track width is abnormal.

Figure 7:
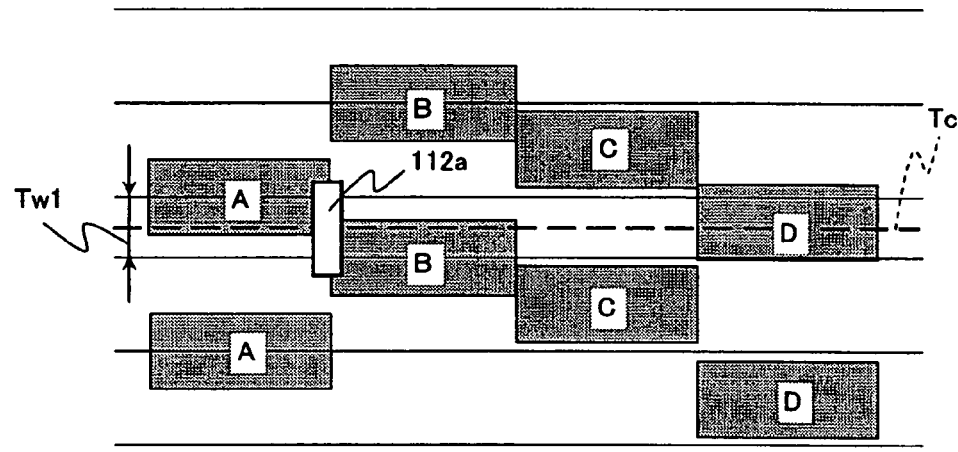
FIG. 7 is a diagram illustrating a burst pattern, the track width of which is abnormal, more specifically, the track width of which is narrower than the normal track width.
Figure 8:
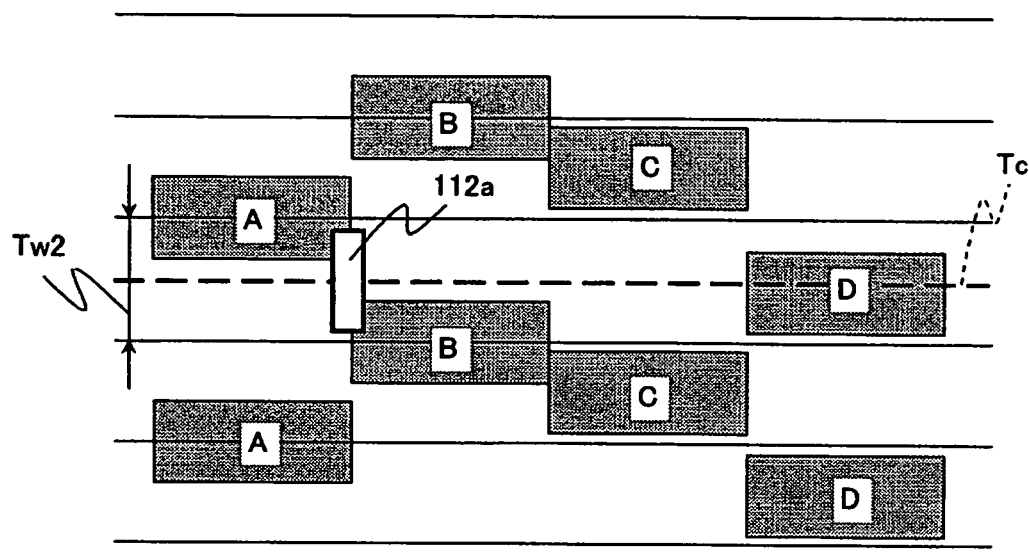
FIG. 8 is a diagram illustrating a burst pattern, the track width of which is abnormal, more specifically, the track width of which is wider than the normal track width.

FIGS. 7 and 8 are diagrams each illustrating a burst pattern, the track width of which is abnormal. FIG. 7 is a diagram illustrating a burst pattern, the track width of which is narrower than the normal track width; and FIG. 8 is a diagram illustrating a burst pattern, the track width of which is wider than the normal track width. What will be described here is a case where the sum of the amplitude of the burst A and that of the burst B is equal to adequate (typical) value X when the track width is normal. As shown in FIG. 4(*b*), initially a gap G should exist between the burst A and the burst B. However, as shown in FIG. 7, if the burst A and the burst B are written while partially overlapping with each other in the radial direction, in other words, if the track width becomes narrow, the ratio of the above-mentioned APB and the value in the normal case (X) greater than 1.0.

On the other hand, as shown in FIG. 8, if the distance in the radial direction between the burst A and the burst B becomes larger than the initial gap G, in other words, if the track width becomes wide, the ratio of the above APB against normal value is smaller than 1.0.

Here, since a seamless burst pattern is written, without overwriting, by one write operation without trimming, the burst A partially overlaps with the burst B in some cases, or a gap is sometimes formed. Accordingly, the APB value fluctuates. In contrast to this, in the case of the seamed burst pattern, as shown in FIG. 5, even if the half track feed of the write head is not correctly achieved in the servo track write process, causing the track width to fluctuate, the burst A and the burst B do not form a gap G. As shown in FIG. 7, since they do not overlap with each other, it is not possible to measure the change in track width depending on APB. On the other hand, in the case of a seamless burst pattern, only by reading the burst pattern in an on-track state once, it becomes possible to detect from APB that the track width is abnormal. If this method is applied to a seamless burst pattern, so long as both the burst A and the burst B can be read at the same time, in other words, so long as the width of the read head 112*a* is larger than the width of the gap G, it is possible to measure the track width.

Thus, in this test processing, if a seamless burst pattern is measured on track, a judgment as to whether the track width is abnormal is made by comparing APB, which is a value changing in accordance with fluctuations in the track width or pitch, with the undermentioned criterion Cr. The criterion Cr is used to judge whether or not the track width or the track pitch is abnormal. For example, if the compared value APB of a target track to be judged deviates by 10% or more from the criterion Cr, it is judged that the track width of the target track is abnormal, and therefore this target track can be stored in the defect table.

The criterion calculation part 212 calculates the criterion Cr on the basis of the APB that has been calculated by the APB calculation part 211. However, the APB value differs due to skew, or the like, for example, between the inner and outer circumferential sides of the disk. Therefore, it is difficult to detect a defective track, the track pitch of which badly balanced, by simply using a certain criterion, for example, by comparing a mean value determined by calculating the total APB with the measured APB, and then by detecting as a defective track a track that goes out of the mean value. For this reason, in this embodiment, APBs of the given number of tracks, which are in proximity to the target track to be judged but exclude a defective track, are averaged, and this mean value is used as the criterion Cr to be compared with APB in the target track. The burst pattern which has been read out usually becomes unnecessary after being used to position the head. However, with the object of determining the criterion Cr, this embodiment includes a function of holding data of the burst pattern that has been read out.

To be more specific, as the criterion Cr of the APB of the current track (target track to be judged), which is calculated by the APB calculation part 211, it is possible to use a mean value of APBs (for example, 10) that have been calculated theretofore by the APB calculation part 211. Thus, the criterion Cr is updated every time the judgment of a target track to be judged is completed. To be more specific, during judgment of a track M, for example, a mean value of APBs from the track (M−10) to the track (M−1) is used as the criterion Cr. Next, when a track (M+1) is judged after the judgment of the track M has been completed, if the track M is not a defective track, a mean value of APBs from a track (M−9) to the track M is used as the criterion Cr. Thus, every time the judgment is completed, the criterion (mean value) is recalculated to update the criterion Cr. If the track M is a defective track, the criterion is not recalculated. In this case, the mean value (previous mean value) of APB from the track (M−10) to the track (M−1) may be used as the criterion, or the mean value of the track (M−9) to the track (M−1) may also be used as the criterion.

In addition, if a track to be judged is an odd number track, a mean value of only APBs of odd number tracks is calculated. If a track to be judged is an even number track, a mean value of only APBs of even number tracks is calculated. The calculated mean value may also be used as the criterion Cr.

Thus, in the case of the track to be judged, the compared value APB is used as a value (judged value) that is compared with a criterion to judge whether or not the track width is abnormal. After the judgment, if the track width is normal, using the APB as a value for calculating the criterion makes it possible to perform the test with high efficiency.

The defective-track judging part 213 compares the criterion Cr, which is successively updated, with APB obtained by reading a burst pattern of a track to be judged. If the APB of the track to be judged deviates from the criterion Cr, for example, by 10% or more, this track can be judged to be a defective track. Here, the track which has been judged to be a defective track is stored in the defect table. The defect table is written and saved in a specified area of the disk 111.

During use of the HDD 100, this defect table is referred to, and thereby tracks stored in the defect table are skipped so that addresses are assigned to only tracks other than the defective tracks. Accordingly, it is possible to disallow the use of the defective tracks. Here, in this embodiment, if a defective track is detected, a cylinder including the defective track is stored in the defect table so that the use of the defective track is disallowed on a cylinder basis. This is because if a defective track is detected in one cylinder, it is often the case that other tracks in this cylinder are also defective. Incidentally, in this embodiment, the defective-track detection is performed for all recording surfaces. Therefore, as a matter of course, only a defective track may also be stored instead of storing a cylinder including the defective track as a defect cylinder. In addition, another method may also be used: executing a test of only one recording surface, and then storing in the defect table a cylinder in which a defective track has been detected. This speeds up the test. Incidentally, the number of tracks which are judged to be defective tracks by the test processing is usually a few tracks. Therefore, even if the use of these tracks or cylinders is disallowed, little influence is exerted on the storage capacity.

Figure 9:
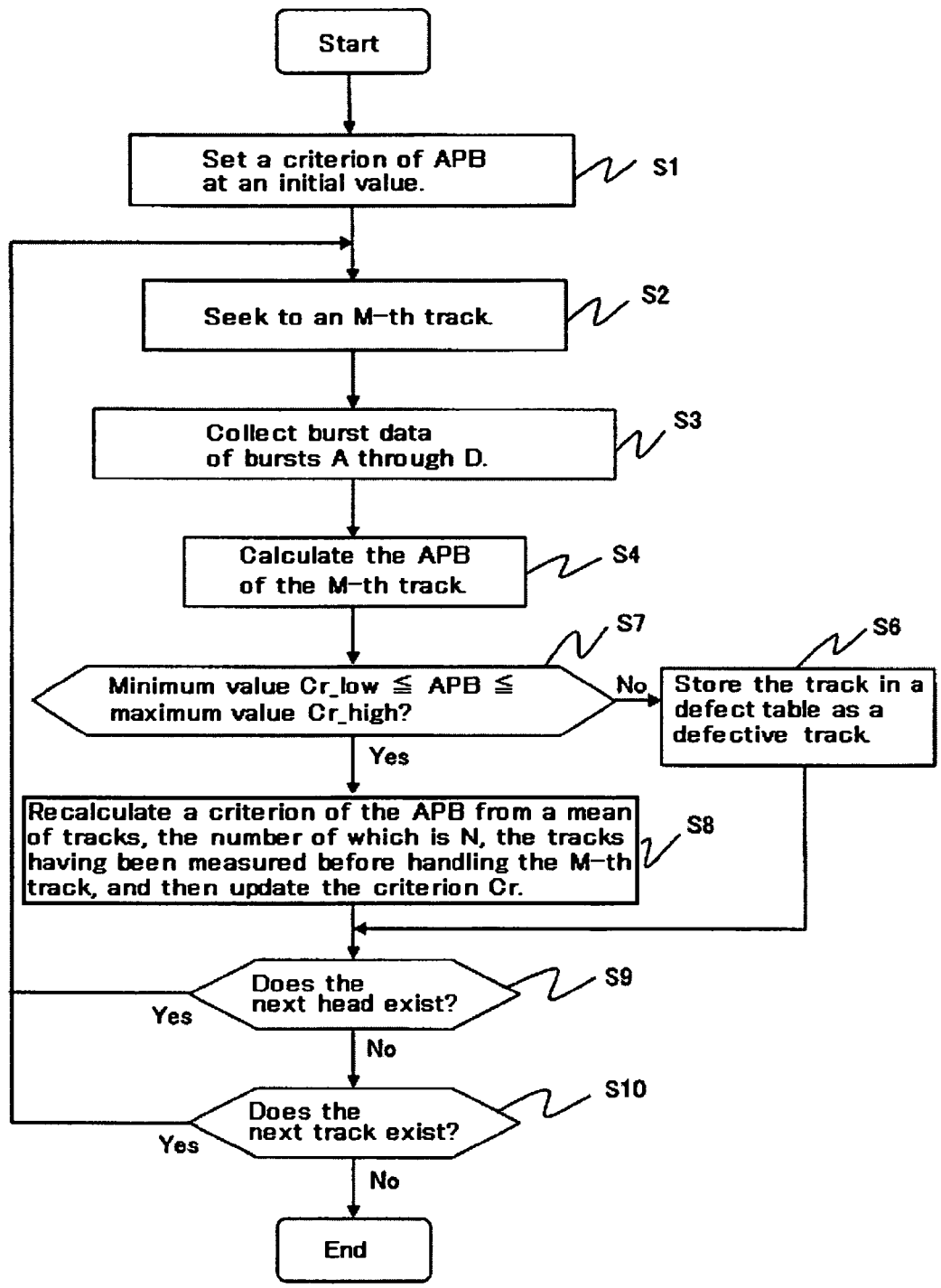
FIG. 9 is a flowchart illustrating a method for detecting a defective track, and then for storing the defective track in a defect table in a HDD according to the embodiment of the present invention.

The defective-track detection method in this embodiment will be specifically described below. FIG. 9 is a flowchart illustrating a method for detecting a defective track, the track width of which is abnormal, and then storing the defective track in the defect table.

As shown in FIG. 9, to begin with, the criterion Cr of APB is set at an initial value (step S1). As described above, a mean value of APBs of several tracks in proximity to a track to be judged, excluding a defective track, is used as the criterion Cr. However, at the time of starting measurement, there is no APB for determining the mean value. Therefore, this criterion is first initialized by the method described later.

Next, a head seeks to an M-th track (step S2) to read the bursts A through D, and then collects the amplitude (burst data) of read signals of the bursts A through D (step S3). After that, on the basis of the collected burst data, the above APB, that is, (A+D)/(C or D), is calculated (step S4).

Next, the determined APB is compared with the criterion Cr to judge whether or not the track M is a defective track (step S7). The criterion Cr is used for comparison as below. If the determined APB is within a range between, for example, a minimum value Cr_low such as the criterion×0.9, and, for example, a maximum value Cr_high such as the criterion× 1.1, it is possible to judge that the track is not a defective track. Then, a mean value of APBs of the given number (=N) of tracks is calculated. Here, the APBs have been obtained before the track M is handled. This calculated mean value is used as a new criterion to update the original criterion (step S8). On the other hand, if the track is judged to be a defective track, the track M in question is stored in the defect table (step S6). Incidentally, in this case, the criterion is not updated, and the criterion used to judge the track M is used to judge the next track.

If the HDD comprises a plurality of disks, a judgment is made as to whether or not the next head exists (step S9). If the judgment as to whether or not a target track (cylinder) is a defective track is completed for all heads, the judgment as to whether or not the next track (cylinder) is a defective track is executed (step S10). To be more specific, if the defective-track judgment is completed for one cylinder, the defective-track judgment is executed for the next cylinder. If the defective-track judgment is completed for all cylinders, the test processing ends.

Next, how to initialize the criterion in the above step S1 will be described. At the start of a test, there is no APB up to the initial N-th track. Therefore, it is not possible to calculate the criterion by the above-mentioned method. In addition, until the calculation of the APB up to the initial N-th track ends, it is not possible to calculate the criterion by the above-mentioned method. For this reason, in this embodiment, the criterion is determined in advance before the start of the defective-track judgment. Then, the defective-track judgment is started by use of this criterion. It is to be noted that after the start of the processing, the criterion may also be updated successively by the obtained APB. Moreover, the criterion which has been determined in advance may also be used up to the N-th track.

The method for determining the criterion in advance will be described below. To begin with, APBs of several tracks in proximity to a starting position of the defective-track judgment is determined. APBs of several tracks are, for example, the APBs of N tracks that are the same as those in the step S8. During determination of the criterion used for initialization, a judgment as to whether or not the APBs have been obtained from normal tracks having no defective track is made by, for example, writing data to the tracks and reading the data from the tracks. In this case, what is required is that the bursts A, B, C, D balance to some extent and do not interfere with adjacent tracks. Thus, the judgment can be made by writing data and reading the data (hereinafter referred to as write and read).

Incidentally, as is the case with the above step S8, if instead of successively updating the criterion, write and read is performed on the whole surface to obtain the criterion, there arises a problem of the work efficiency. In addition, if write and read is performed, it becomes difficult to judge whether it is a defective track caused by disturbance, or noise caused by disturbance. Therefore, the method in which APBs are calculated to successively update the criterion Cr is most efficient.

Figure 10:
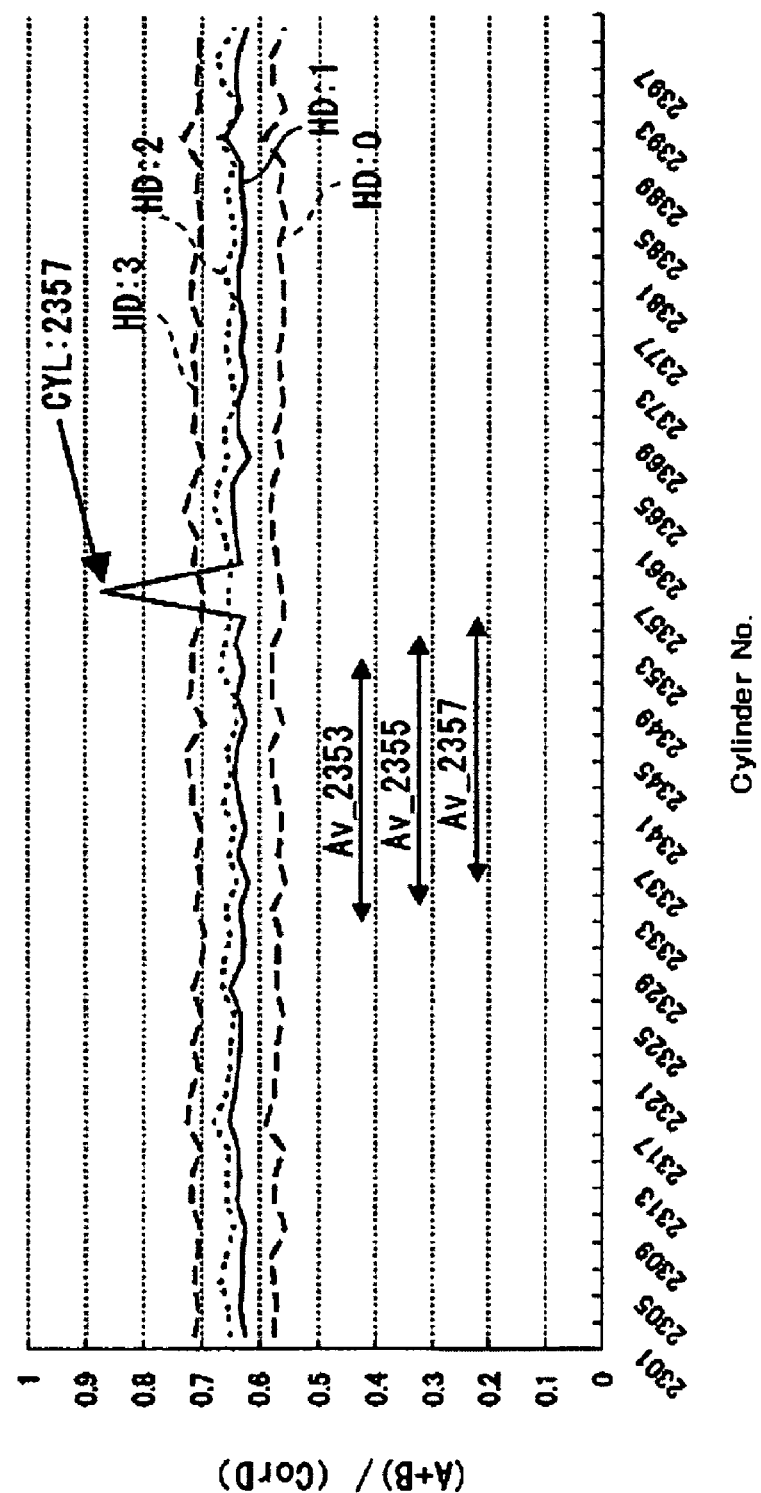
FIG. 10 is a graph illustrating the result of actually making a defective-track judgment by a test method according to the embodiment of the present invention.
Figure 11:
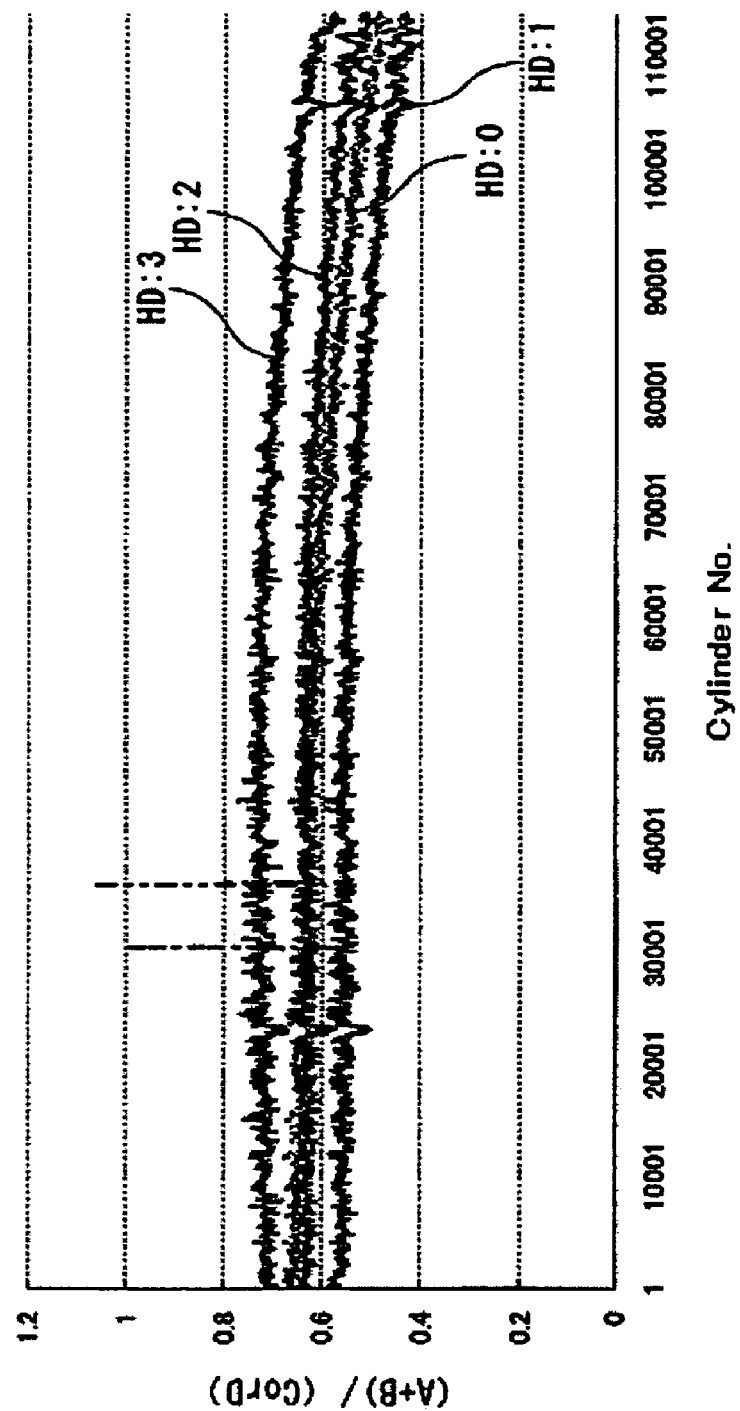
FIG. 11 is a graph illustrating the result of actually making a defective-track judgment by a test method according to the embodiment of the present invention.

FIGS. 10 and 11 are graphs each illustrating the result of actually performing the defective-track judgment. Here, FIG. 10 illustrates the results of the defective-track judgment by APBs of odd number cylinders having cylinder numbers (CYL) from 2301 to 2397. FIG. 11 illustrates the result of the defective-track judgment of odd number cylinders having cylinder numbers (CLY) from 1 to 110001. In addition, in FIGS. 10 and 11, a vertical axis indicates APB, more specifically, a value of (A+B)/(C or D) in which the amplitude of the bursts A through D are shown in A through D; and a horizontal axis indicates a cylinder number. In either case, the test results of the HDD having four heads (four recording surfaces) are illustrated. For example, the criterion Cr which is updated in the step S8 is determined as follows: if the criterion Cr is used for the defective-track judgment of CLY 2353, a mean value Av_2353 of five APBs in odd number cylinders having CYL 2333 through CYL 2351 is used; if the criterion Cr is used for the defective-track judgment of CLY 2355, a mean value Av_2355 of five APBs in odd number cylinders having CYL 2335 through CYL 2353 is used; and if the criterion Cr is used for the defective-track judgment of CLY 2357, a mean value Av_2357 of five APBs in odd number cylinders having CYL 2335 through CYL 2353 is used.

A mean value of APBs of consecutive tracks, which have been measured prior to a track to be judged, can be used as the criterion. However, as shown in FIG. 6, it is also possible to independently provide a criterion for odd number tracks and that for even number tracks. A burst pattern read when calculation of APB differs between an odd number cylinder and an even number cylinder; that is, the burst pattern is the burst C or the burst D. Therefore, for example, if APB=(A+B)/C in the odd number cylinder, a mean value of APBs, which are obtained from odd number cylinders prior to a target odd number cylinder to be judged, is used as the criterion Cr. As a result, it is possible to obtain a more correct criterion that is a mean of APBs of consecutive tracks, and comparison with this criterion enables more correct judgment.

Further, it is also possible to use, for example, an absolute value of (A+B) to perform the defective-track judgment. However, if the absolute value is used, a value of the amplitude varies, which makes it difficult to obtain a criterion, possibly resulting in a decrease in efficiency and accuracy. Therefore, as described in this embodiment, it is desirable to use a value (APB) that is obtained by dividing it by the amplitude of the burst C or the burst D. This enables highly accurate judgment.

In the defective-track judgment in the step S7, APB within a range between a minimum value Cr_low and a maximum value Cr_high of the criterion Cr is judged to be normal. Here, for example, 0.9 Cr and 1.1 Cr (a mean value Av (=Cr) of the given number of tracks, which has been obtained in the manner described above) can be used as the minimum value and the maximum value respectively. In other words, if APB deviates from the criterion Cr by 10% or more, the track is judged to be a defective track. Thus, instead of making a comparison using a mean value of all tracks as a criterion, a comparison is made using a mean value of APBs of local tracks as a criterion. If the relative displacement Δ between tracks is 10% or more, the track is judged to be a defective track. As described above, this is because a value of APB differs between the outer circumferential (OD) side and the inner circumferential (ID) side due to skew or the like. In addition, this is because an object of the defective-track judgment is to detect the inconsistency in the track width between tracks in proximity to one track. To be more specific, the object of the defective-track detection is not to detect a track that deviates from a mean value of all track widths, but to detect a track, the track width of which differs from other track widths in a local area, so that an error can be prevented from occurring at the time of read and write. Therefore, it is necessary to use as a criterion a mean value of APBs of local tracks in proximity to a track to be judged. Accordingly, as shown in this embodiment, the most efficient method is judging APB and updating a criterion of APB at the same time.

In this embodiment, the HDD 100, in which a position of the head is controlled by servo data, reads by itself the servo data, and thereby executes the detection of a defective track that is performed after the servo data is written, and that is performed before shipping. That is, the HDD 100 executes the test processing that checks whether or not the track width is normal. Therefore, for example, by actually writing data and then reading the data (write and read), it is possible to complete the test in a remarkably shorter period of time as compared with the method in which a defective track is detected. In addition, if the judgment as to whether or not the track width is abnormal is made by read and write, it is not possible to identify an error, that is to say, abnormal track width, or an error caused by disturbance, or the like, at the time of write or read. Therefore, the test result is not reliable. However, the test processing in this embodiment reads a burst pattern to make a judgment, without writing and reading data, as to whether or not the track width is normal. Accordingly, it is possible to make a correct judgment.

Moreover, since the seamless burst pattern is used, it is possible to measure fluctuations in the track width by reading a servo pattern in an on-track state. Accordingly, the speed of test processing is remarkably faster than that of the conventional method in which, for example, write and read is performed before reading of a servo pattern twice in an off-track state. Since the defective-track detection can be executed in a short period of time, it is possible to reduce the manufacturing cost of HDDs, and to dramatically improve the productivity.

Further, because a program for executing the test processing is written on the disk so that the program can be executed, a self test becomes possible, which enables a further reduction in the cost of the test processing.

In addition, APB is a value corresponding to the track width calculated from a burst pattern. A mean value of tracks in proximity to a track to be judged is successively updated so as to determine the criterion Cr used to judge whether or not the APB is normal. Thus, it is possible to correctly detect an abnormal state of the track width in a certain local track, and a change in track width in adjacent tracks by 10% or more.

Moreover, at the time of test processing, the HDD 100 is connected to an outside inspection apparatus such as a personal computer, for example. Accordingly, the test result can be output to the inspection apparatus. In the inspection apparatus, by collecting the statistics of the test result that has been output, it is possible to make use of the test result to further reduce defective tracks of the HDD. In addition, the test result and the test processing program can be kept stored in the disk 111 even after the test is ended. As a result, for example, in the event that a malfunction of the HDD 100 occurs, it is possible to read out data used when the test processing of the disk 111 has been performed, and then to verify the data.

Incidentally, the present invention is not limited to the embodiments described above, and as a matter of course, the present invention can be changed in various ways within the scope that does not deviate from points of the present invention. For example, in the embodiment described above, the test processing was described as a software configuration. However, the present invention is not limited to this, and arbitrary processing in the test processing can also be configured as hardware.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A disk unit comprising:

a head at least for reading data;

a disk to which servo data including first second, third, and fourth burst patterns is written, said servo data being used to position the head to a track center; and a defective-track detecting part configured to detect a target track to be judged, to which both the first and second burst patterns are written, as a defective track whose track width is abnormal if a compared value obtained on the basis of the result of reading all the first and second burst patterns and either the third or fourth burst pattern by one read operation of the head is outside a specified range, wherein said first and second burst patterns are constant in size in the track width direction regardless of the track width.

2. A disk unit according to claim 1, wherein:

said defective-track detecting part uses, as the track center, a position at which a result of reading the first burst pattern and a result of reading the second burst pattern are balanced with each other, and detects the defective track from the result of reading the first and second burst patterns and either the third or fourth burst pattern by the head that has been positioned to the track center.

3. A disk unit according to claim 2, wherein:
said head is positioned to a position at which the read-signal amplitude of the first burst pattern becomes equivalent to the read-signal amplitude of the second burst pattern.

4. A disk unit according to claim 1, wherein:
said first, second, third, and fourth burst patterns are written without trimming.

5. A disk unit according to claim 1, wherein:
a gap fluctuating in accordance with the track width is formed in the track width direction between said first and second burst patterns.

6. A disk unit according to claim 1, further comprising:
a compared-value calculation part configured to calculate the compared value;
wherein on the basis of a result of comparing between a criterion used to judge whether or not the track width is abnormal and the compared value for the track to be judged, said defective-track detecting part judges whether or not the track to be judged is a defective track.

7. A disk unit according to claim 6, wherein:
said compared-value calculation part calculates the compared value on the basis of the sum of the read-signal amplitude of the first burst pattern and the read-signal amplitude of the second burst pattern.

8. A disk unit according to claim 1, wherein:
the first burst pattern is written to one track boundary of said track to be judged, and the second burst pattern is written to the other track boundary of said track to be judged.

9. A disk unit according to claim 7, wherein:
said third burst pattern is written to an odd number track and said fourth burst pattern is written to an even number track; and
said compared-value calculation part calculates the compared value on the basis of the result of reading the first and second burst patterns and the third or fourth burst pattern.

10. A disk unit according to claim 9, wherein:
said compared-value calculation part calculates the compared value by dividing the sum of the read-signal amplitude of the first burst pattern and the read-signal amplitude of the second burst pattern by the read-signal amplitude of the third burst pattern or the read-signal amplitude of the fourth burst pattern.

11. A disk unit according to claim 10, further comprising:
a criterion calculation part that determines a criterion used to judge whether or not the track width of said track to be judged is abnormal by calculating a mean value of the compared values of a given number of tracks, excluding the defective track, among the compared values calculated by the compared-value calculation part.

12. A disk unit according to claim 10, further comprising:
a criterion calculation part that calculates a criterion used to judge whether or not the track width of said track to be judged is abnormal as a mean value of the compared values of a given number of tracks, excluding the defective track, among the compared values calculated by the compared-value calculation part, wherein the given number of tracks are odd number tracks if the track to be judged is an odd number track, and the given number of tracks are even number tracks if the track to be judged is an even number track.

13. A disk unit according to claim 1, further comprising:
a criterion calculation part for calculating, on the basis of the compared value, a criterion used to determine the specified range.

14. A disk unit according to claim 1, further comprising:
a criterion calculation part configured to calculate, on the basis of the compared value, a criterion used to determine the specified range;
wherein said criterion calculation part calculates the criterion on the basis of the compared values of tracks in proximity to the track to be judged.

15. A disk unit according to claim 1, further comprising:
a criterion calculation part configured to calculate, on the basis of the compared value, a criterion used to determine the specified range;
wherein after judging the track to be judged, said criterion calculation part updates the criterion on the basis of the result of the judgment.

16. A disk unit according to claim 15, wherein:
if the track to be judged is not a defective track, said criterion calculation part determines a mean value from the compared values of a given number of tracks including the track to be judged, and then updates the criterion.

17. A disk unit according to claim 1, wherein:
said defective-track detecting part stores the defective track in a defect table.

18. A disk unit according to claim 17, further comprising:
a write control part configured to control data write of the head by referring to the defect table;
wherein said write control part refers to the defect table, and thereby disallows write to the defective track.

19. A disk unit according to claim 18, wherein:
said defective-track detecting part stores a cylinder including the defective track in a defect table as a defect cylinder.

20. A disk unit according to claim 17, wherein:
said disk includes the defect table.

21. A disk unit comprising:
a disk to which servo data including first and second burst patterns is written, said first and second burst patterns being written with the size in the track width direction being kept constant regardless of the track width, said servo data defining, as a track center, a position at which a result of reading the first burst pattern and a result of reading the second burst pattern are balanced with each other;
a head at least for reading data; and
a defective-track detecting part configured to detect a defective track in which a compared value obtained from a result of reading at a position at which both the first and second burst patterns are read by one read operation of the head is outside a specified range.

22. A disk unit according to claim 21, wherein:
said defective-track detecting part detects the defective track on the basis of the compared value obtained from the result of reading by the head positioned to the track center.

23. A disk unit according to claim 21, wherein:
said first and second burst patterns are written without trimming.

24. A disk unit according to claim 21, wherein:
a gap fluctuating in accordance with the track width is formed in the track width direction between the first and second burst patterns and between third and fourth burst patterns.

25. A disk-unit manufacturing method for manufacturing a disk-unit comprising: a head at least for reading data; and a disk to which servo data including first and second burst patterns is written, said servo data being used to position the head to a track center, said method comprising:

calculating a compared value on the basis of the result of reading the first and second burst patterns by one read operation of the head;

if the compared value is outside a specified range, judging that a track to be judged to which both the first and second burst patterns are written is a defective track; and disallowing the use of the defective track in advance, wherein said servo data is written in a manner that the first and second burst patterns are constant in size in the track width direction regardless of the track width.

26. A disk-unit manufacturing method according to claim 25, further comprising:

writing a defect table to a specified area on the disk to disallow the use of the defective track in advance.

27. A disk-unit manufacturing method according to claim 26, further comprising:

writing servo data to the disk;

reading the written servo data to detect the defective track; and disallowing the use of the detected defective track in advance.

28. A disk-unit manufacturing method according to claim 27, wherein:

when writing the servo data, said first and second burst patterns are written without trimming.

* * * * *

UNITED STATES PATENT AND TRADEMARK OFFICE
CERTIFICATE OF CORRECTION

PATENT NO. : 7,423,825 B2
APPLICATION NO. : 11/172199
DATED : September 9, 2008
INVENTOR(S) : Naoki Shimamura et al.

It is certified that error appears in the above-identified patent and that said Letters Patent is hereby corrected as shown below:

Column 1, line 59 (the same error occurs twice): please delete "Th" and insert --Tb--
please delete "Th" and insert --Tb--
Column 13, line 60 please delete "Th" and insert --Tb--

Signed and Sealed this

Eighteenth Day of November, 2008

JON W. DUDAS
*Director of the United States Patent and Trademark Office*